(12) United States Patent
Matsumura et al.

(10) Patent No.: US 7,740,558 B2
(45) Date of Patent: Jun. 22, 2010

(54) AUTOMATIC TRANSMISSION, CONTROL APPARATUS AND CONTROL METHOD FOR THE SAME

(75) Inventors: Tetsuo Matsumura, Hitachinaka (JP); Yoshiyuki Yoshida, Hitachi (JP); Kinya Fujimoto, Hitachinaka (JP); Masashi Seimiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 556 days.

(21) Appl. No.: 11/640,237

(22) Filed: Dec. 18, 2006

(65) Prior Publication Data
US 2007/0137339 A1 Jun. 21, 2007

(30) Foreign Application Priority Data
Dec. 19, 2005 (JP) ............................. 2005-365262

(51) Int. Cl.
*B60W 10/00* (2006.01)
(52) U.S. Cl. ........................... 477/79; 74/331; 192/52.4
(58) Field of Classification Search .................... 74/331
See application file for complete search history.

(56) References Cited

U.S. PATENT DOCUMENTS

| | | | |
|---|---|---|---|
| 4,790,418 A * | 12/1988 | Brown et al. .................. 701/51 |
| 5,667,052 A * | 9/1997 | Richardson ............... 192/85 R |
| 6,286,381 B1 * | 9/2001 | Reed et al. ................. 74/336 R |
| 6,679,134 B2 * | 1/2004 | Shigyo ...................... 74/336 R |
| 6,878,095 B2 * | 4/2005 | Shigyo .......................... 477/86 |
| 6,949,051 B2 * | 9/2005 | Katakura ..................... 477/175 |
| 7,451,031 B2 * | 11/2008 | Kuwahara et al. ............. 701/51 |

FOREIGN PATENT DOCUMENTS

| | | |
|---|---|---|
| JP | 10-318361 A | 12/1998 |
| JP | 2000-234654 A | 8/2000 |
| JP | 2001-295898 A | 10/2001 |
| JP | 2003-269592 A | 9/2003 |

* cited by examiner

*Primary Examiner*—David D Le
*Assistant Examiner*—Justin Holmes
(74) *Attorney, Agent, or Firm*—Crowell & Moring, LLP

(57) ABSTRACT

A transmission control unit predicts a next gear position when a predetermined gear position is achieved. In accordance with a result of the prediction, the transmission control unit operates a predetermined synchromesh to execute a standby control (pre-shift control). In the standby control, a transmission input shaft connected to a friction transfer mechanism not used for achieving a current gear position and a transmission output shaft are connected to each other via a predetermined gear train, and made standby. The transmission control unit makes different from each other an engagement load of the synchromesh when a connection of the synchromesh is done in accordance with the prediction result and an engagement load of the synchromesh when a connection of the synchromesh is done in accordance with the other condition different from the prediction result.

5 Claims, 15 Drawing Sheets

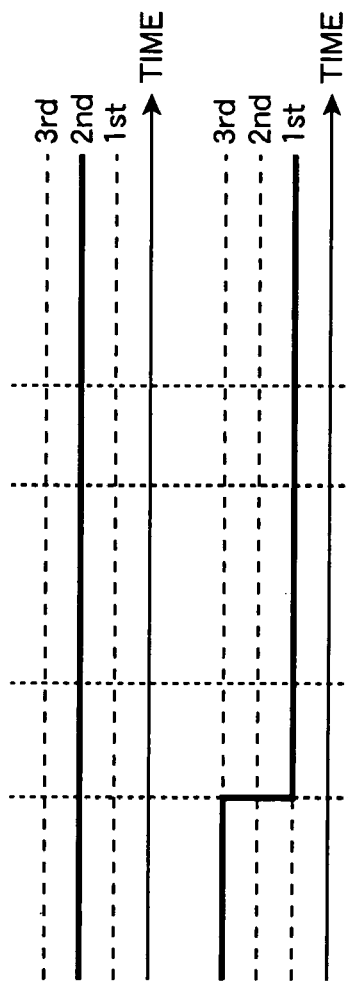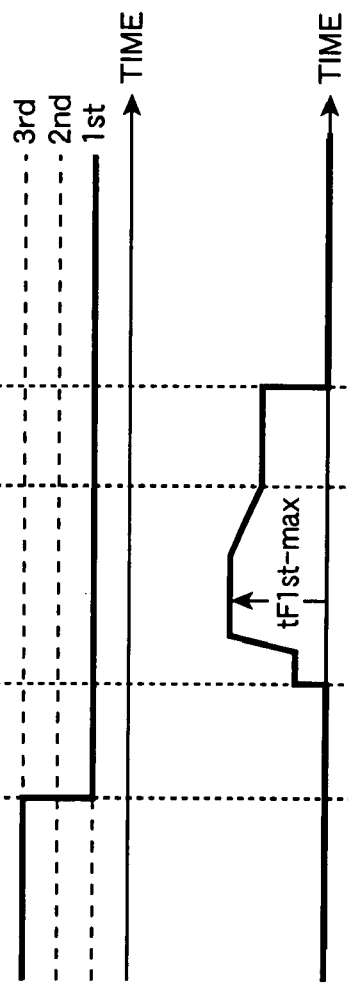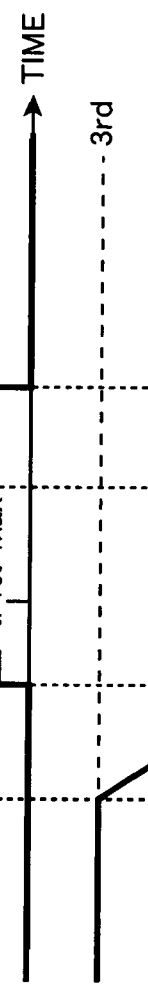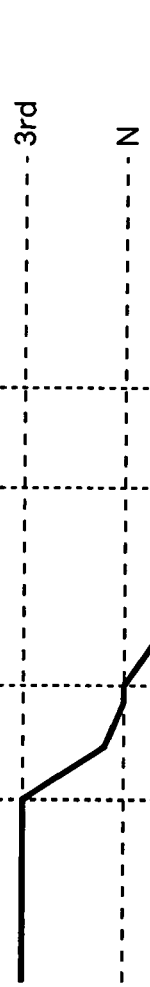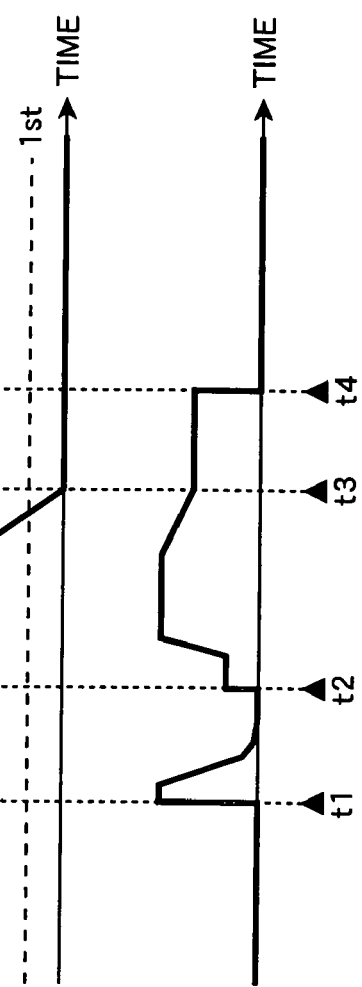
FIG. 7(A) TARGET GEAR POSITION tGP_nxt
FIG. 7(B) TARGET STANDBY POSITION tGP_stb
FIG. 7(C) 1st-GEAR ENGAGEMENT LOAD tF1st
FIG. 7(D) SLEEVE-1 POSITION RPslv1
FIG. 7(E) CURRENT OF ELECTRO-MAGNETIC VALVE 105d

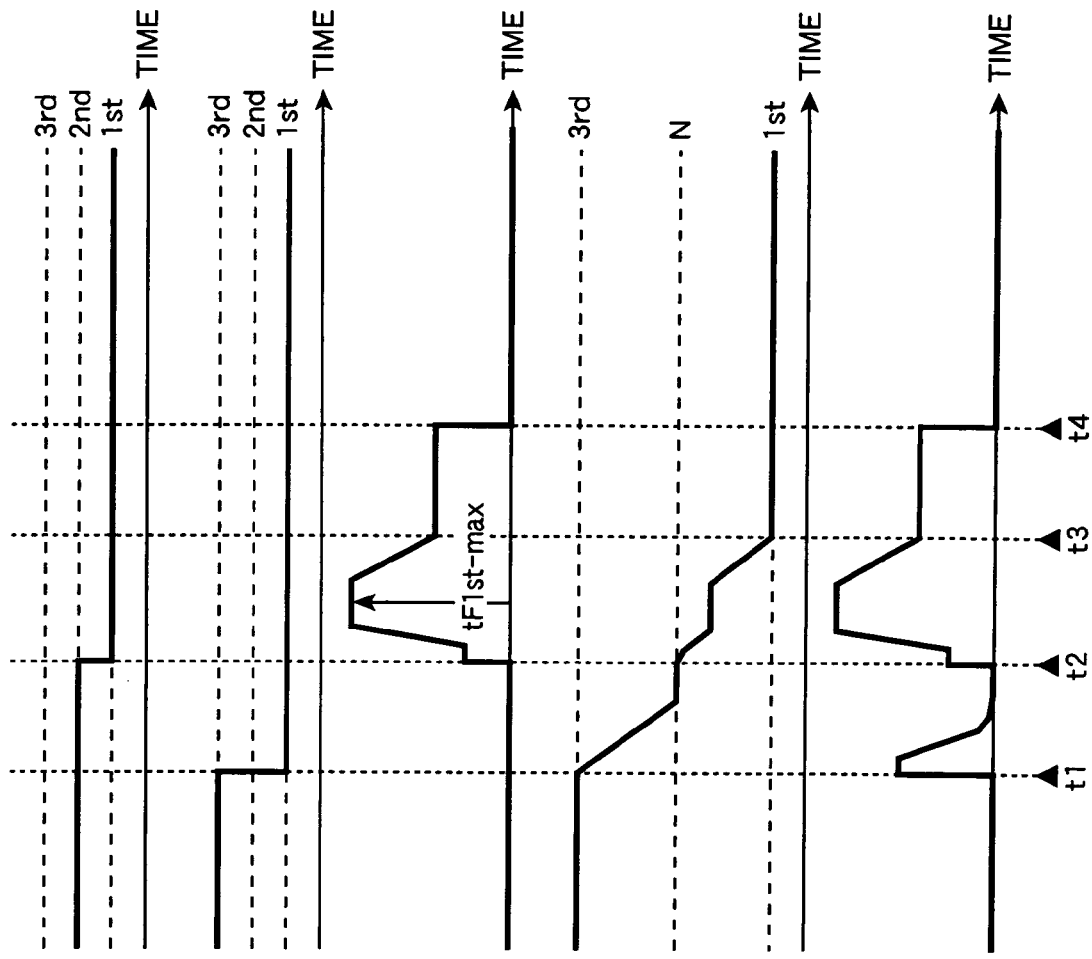

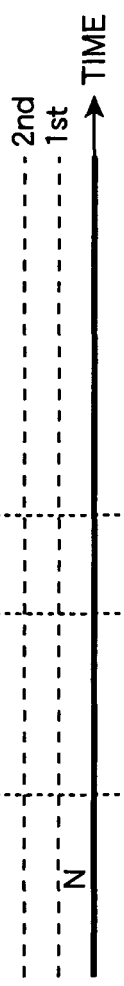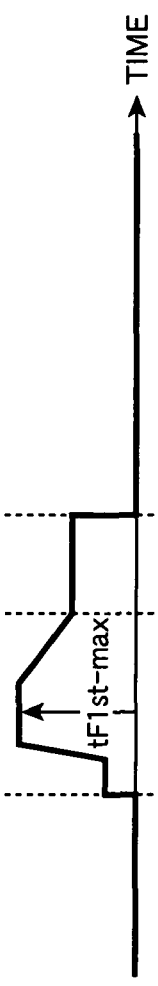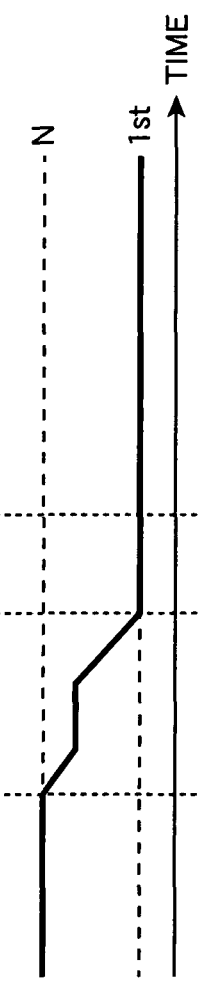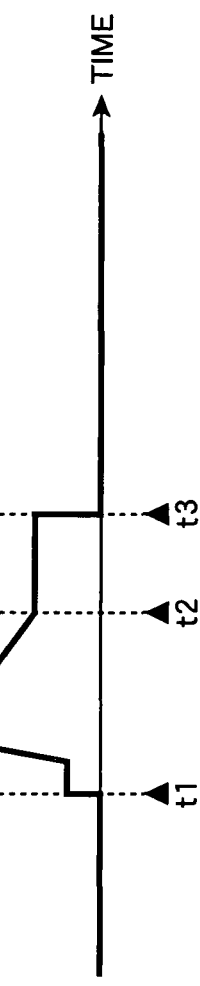
FIG. 9(A) TARGET GEAR POSITION tGP_nxt
FIG. 9(B) TARGET STANDBY POSITION tGP_stb
FIG. 9(C) 1st-GEAR ENGAGEMENT LOAD tF1st
FIG. 9(D) SLEEVE-1 POSITION RPslv1
FIG. 9(E) CURRENT OF ELECTRO-MAGNETIC VALVE 105d

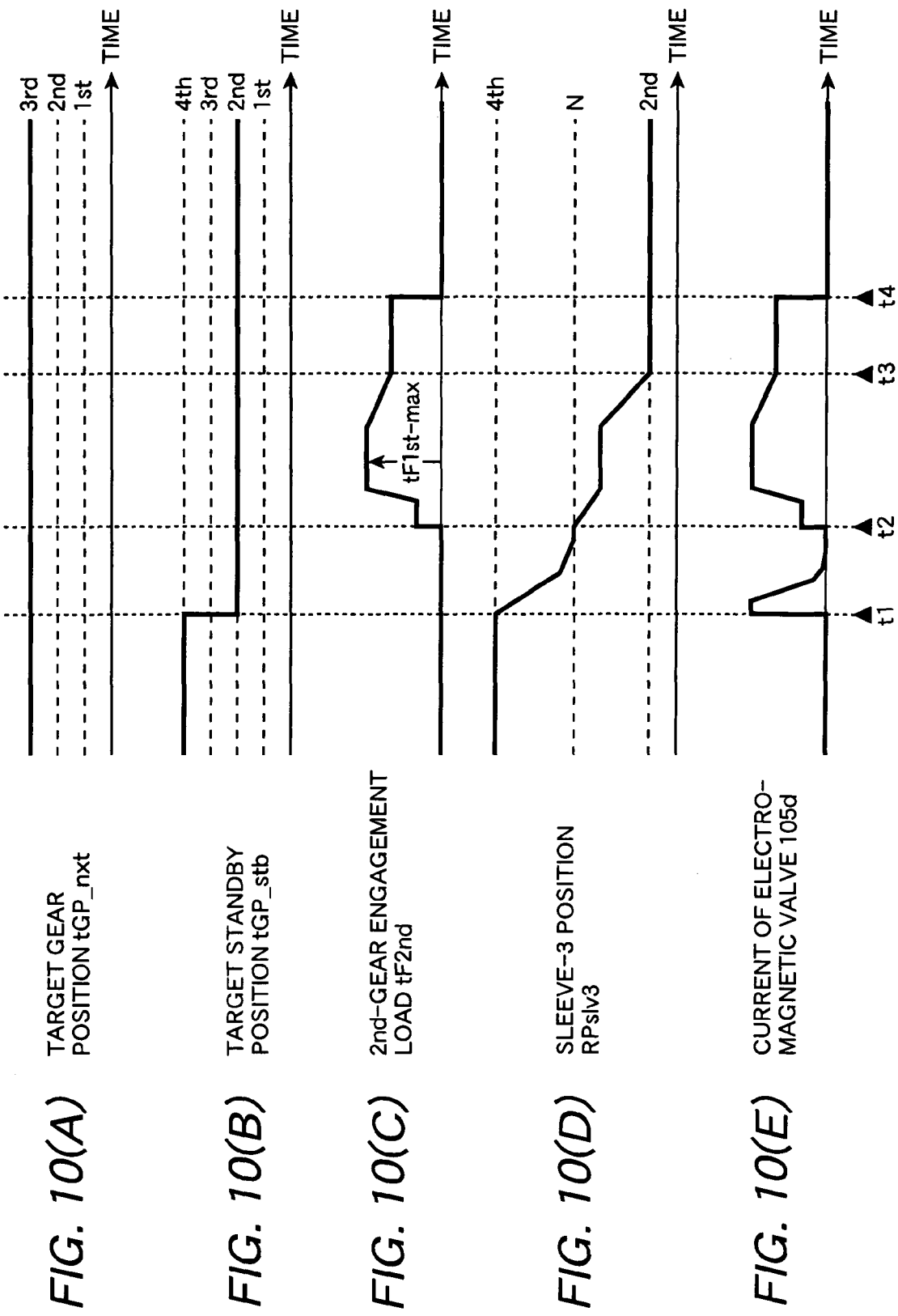

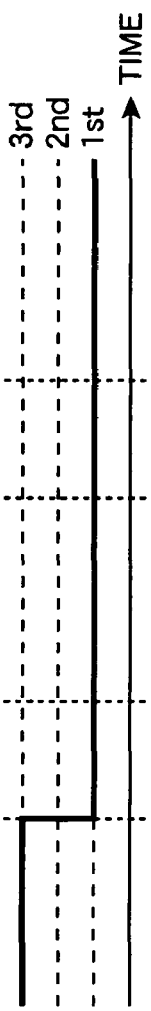
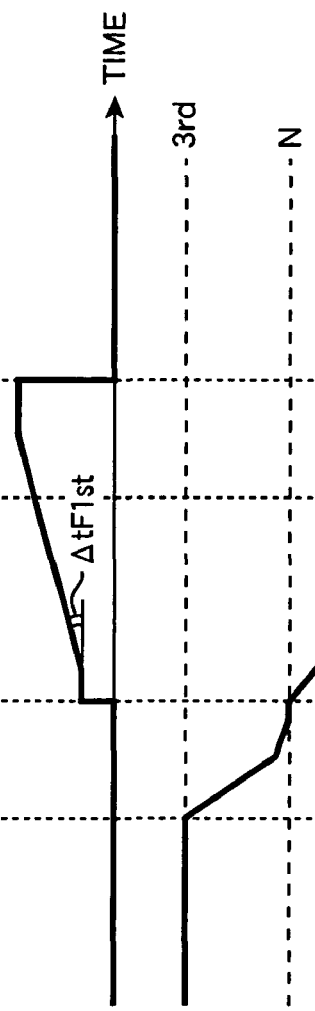
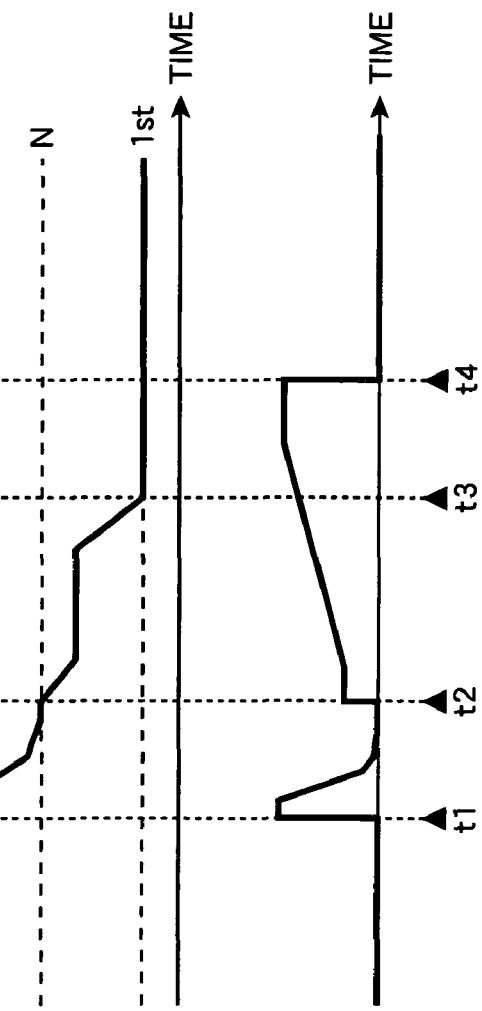
FIG. 13(A) TARGET GEAR POSITION tGP_nxt
FIG. 13(B) TARGET STANDBY POSITION tGP_stb
FIG. 13(C) 1st-GEAR ENGAGEMENT LOAD tF1st
FIG. 13(D) SLEEVE-1 POSITION RPslv1
FIG. 13(E) CURRENT OF ELECTRO-MAGNETIC VALVE 105d

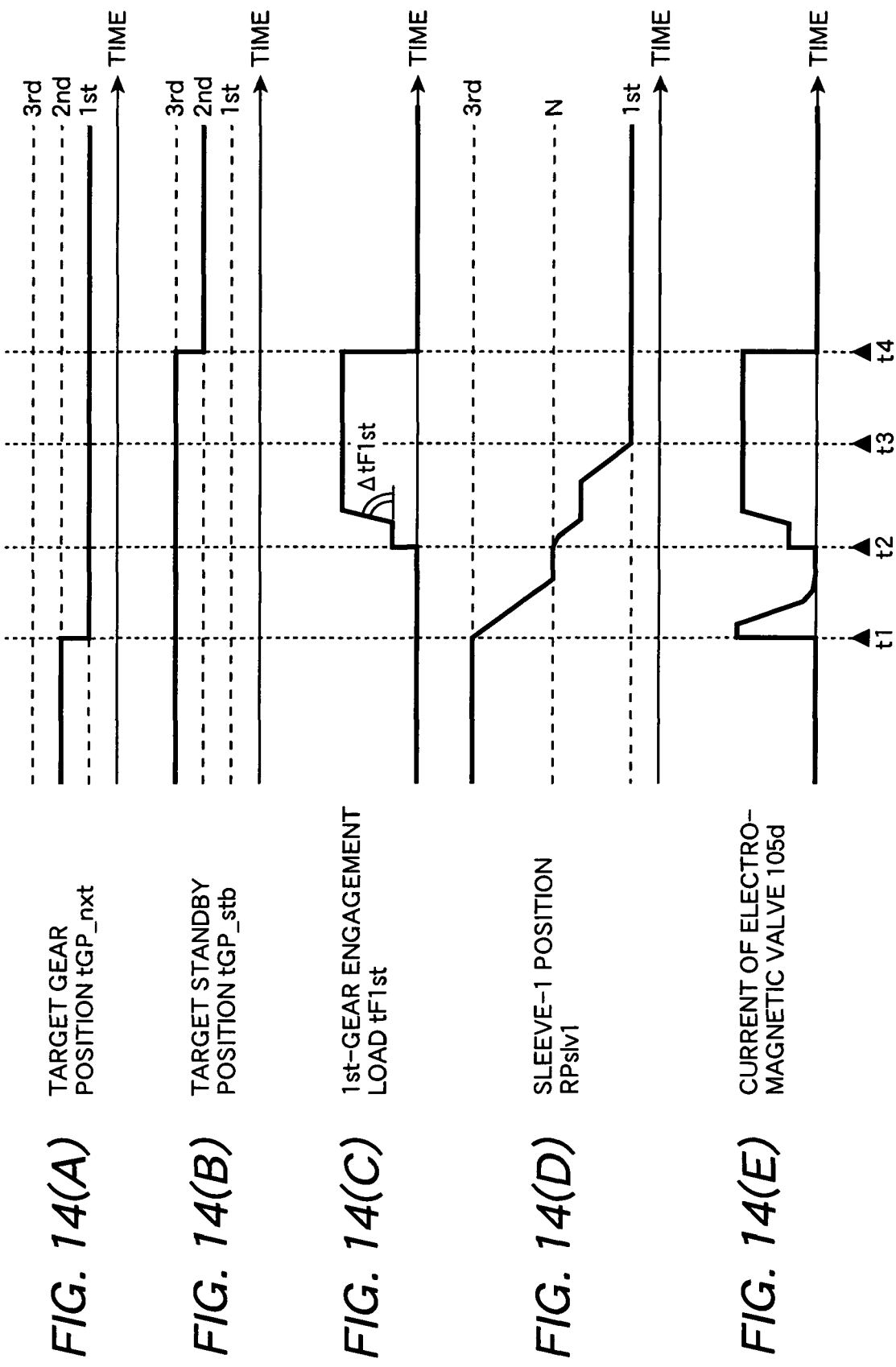

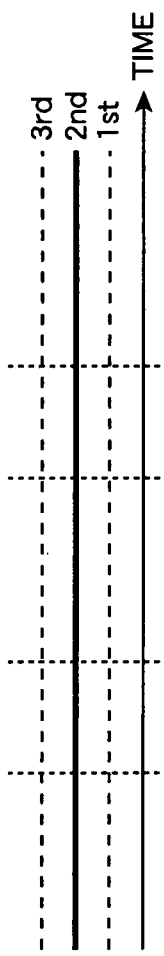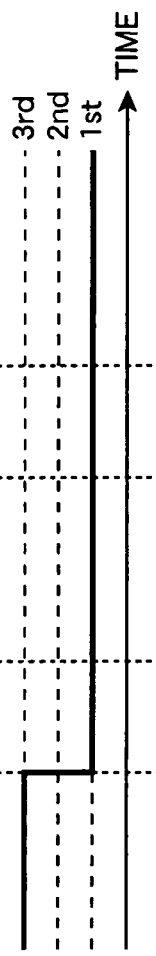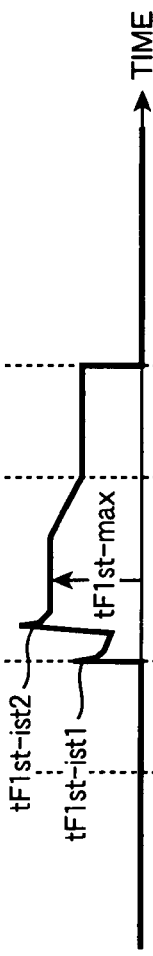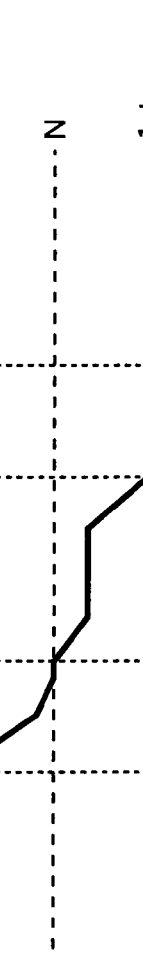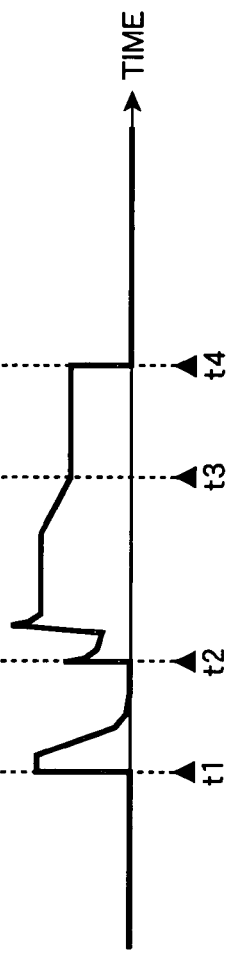
FIG. 15(A) TARGET GEAR POSITION tGP_nxt
FIG. 15(B) TARGET STANDBY POSITION tGP_stb
FIG. 15(C) 1st-GEAR ENGAGEMENT LOAD tF1st
FIG. 15(D) SLEEVE-1 POSITION RPslv1
FIG. 15(E) CURRENT OF ELECTRO-MAGNETIC VALVE 105d

AUTOMATIC TRANSMISSION, CONTROL APPARATUS AND CONTROL METHOD FOR THE SAME

The present application claims priority from Japanese application serial no. 2005-365262, filed on Dec. 19, 2005, the content of which is hereby incorporated by reference into this application.

BACKGROUND OF THE INVENTION

The present invention relates to an automatic transmission, control apparatus and control method for the same, particularly, relates to them preferable for a gear type transmission used in a vehicle.

In recent years, by use of a gear type transmission used for a manual transmission, an automated manual transmission (hereinafter called an "automated MT") has been developed as a system where operation of a clutch, which is a friction mechanism, and operation of a synchromesh, which is a gear selection mechanism, are automated. In the automated MT, when shifting starts, a clutch for transmitting and cutting off torque of an engine, which is a driving power source, is disengaged, a synchromesh is switched, and then the clutch is engaged again.

Japanese Patent Laid-Open No. 2000-234654 and Japanese Patent Laid-Open No. 2001-295898 discloses a twin clutch type automated MT is known. The twin clutch type automated MT is configured such that two clutches transfer output power (driving torque) from an engine to a transmission alternately. In this twin clutch type automated MT, when shifting starts, one clutch which currently transfers torque before the shifting is gradually disengaged, and the other clutch to be the next gear position is gradually engaged. Then, the driving torque is changed from torque for the gear ratio before the shifting to torque for the gear ratio after the shifting. Therefore, interruption of the driving torque can be avoided, and smooth shifting can be achieved.

In a conventional twin clutch type automated MT, for example, as described in Japanese Patent Laid-Open No. 1998-318361 and Japanese Patent Laid-Open No. 2003-269592, the next gear is predicted to shorten a time for shifting to the next gear position. Then, the transmission input shaft connected to the clutch not used for the current gear change position is selectively connected to a transmission-output shaft by a synchromesh. Accordingly, a predetermined gear position to be predicted next is made standby. This is known as the so-called pre-shift control.

However, in the conventional twin clutch type automated MT, in order to execute the above pre-shift control, the synchromesh for connecting the transmission-input shaft to the transmission-output shaft is frequently used in comparison to the automated MT which is not a twin clutch type. Therefore, deterioration of the synchromesh may be hastened.

SUMMARY OF THE INVENTION

The present invention is to provide an automatic transmission in which deterioration of a synchromesh due to a pre-shift control can be suppressed.

(1) In the present invention, to achieve the above object, an automatic transmission control apparatus is used in an automatic transmission and has control means. The automatic transmission comprises plural friction transfer mechanisms for transferring and cutting off output power from a driving power source, plural transmission-input shafts connected to the friction transfer mechanisms, respectively, and plural change gear trains for selectively connecting between one of the input shafts and a transmission-output shaft by selectively engaging to anyone selected among plural synchromeshes.

Furthermore, a desired change gear transmission is set by connecting one of the input shafts to the output shaft by engaging the selected synchromesh to the selected change gear and engaging one friction transfer mechanism corresponding to one input shaft to be connected to the output shaft while disengaging other friction transfer mechanism.

Furthermore, the automatic transmission control apparatus comprises a controller which predicts a next gear change position while executing transmission under a current gear change position. Then the control apparatus controls a predetermined synchromesh in accordance with a result of the above prediction to execute a standby control, so that a transmission-input shaft connected to a friction transfer mechanism not being used for the current gear change position and the output shaft are connected to each other via gears predicted to be the next gear change position. The controller makes different from each other a synchromesh-engagement load when the synchromesh engages to the selected change gear in accordance with the result of the above prediction and a synchromesh-engagement load when the synchromesh engages to the selected change gear under a condition other than the result of the prediction.

In this structure, deterioration of the synchromesh due to the pre-shift control can be kept down.

(2) In the above-mentioned (1), the controller preferably makes the engagement load of the synchromesh when the synchromesh engages to the selected change gear in accordance with the result of the above prediction smaller than the synchromesh-engagement load when the synchromesh engages to the selected change gear under a condition other than the result of the prediction.

(3) In the above-mentioned (1), the controller preferably makes a maximum value in the synchromesh-engagement load when the synchromesh engages to the selected change gear in accordance with the result of the above prediction smaller than that when the synchromesh engages to the selected change gear under a condition other than the result of the prediction.

(4) In the above-mentioned (1), the controller preferably makes a rate of change in the synchromesh-engagement load when the synchromesh engages to the selected change gear in accordance with the result of the above prediction smaller than that when the synchromesh engages to the selected change gear under a condition other than the result of the prediction.

(5) In the above-mentioned (1), the controller preferably changes, the synchromesh-engagement load when the synchromesh engages to the selected change gear under a condition other than the result of the above prediction, in accordance with an accelerator pedal position.

(6) In the above-mentioned (1), the controller changes the synchromesh-engagement load when the synchromesh engages to the selected change gear under a condition other than the result of the above prediction, corresponding to in the case of an automatic shifting mode for selecting a target gear position automatically, and in the case of a manual shifting mode where a driver can select a target gear position, respectively.

In the present invention, deterioration of the synchromesh due to the pre-shift control can be suppressed.

BRIEF DESCRIPTION OF THE DRAWINGS

FIG. 7 is a time chart showing an example of a first shift control of the vehicle having the automatic transmission of the first embodiment of the present invention.

FIG. 8 is a time chart showing an example of a second shift control of the vehicle having the automatic transmission of the first embodiment of the present invention.

FIG. 9 is a time chart showing an example of a third shift control of the vehicle having the automatic transmission of the first embodiment of the present invention.

FIG. 10 is a time chart showing an example of a forth shift control of the vehicle having the automatic transmission of the first embodiment of the present invention.

FIG. 13 is a time chart showing an example of a first shift control of the vehicle having the automatic transmission of the second embodiment of the present invention.

FIG. 14 is a time chart showing an example of a second shift control of a vehicle having the automatic transmission of the second embodiment of the present invention.

FIG. 15 is a time chart showing an example of a first shift control of the vehicle having an automatic transmission control apparatus of a third embodiment of the present invention.

DETAILED DESCRIPTION OF THE PREFERRED EMBODIMENTS

In reference to FIGS. 1 to 10, a structure and operation of an automatic transmission control apparatus (including its method) of a first embodiment of the present invention are explained.

Figure 1:
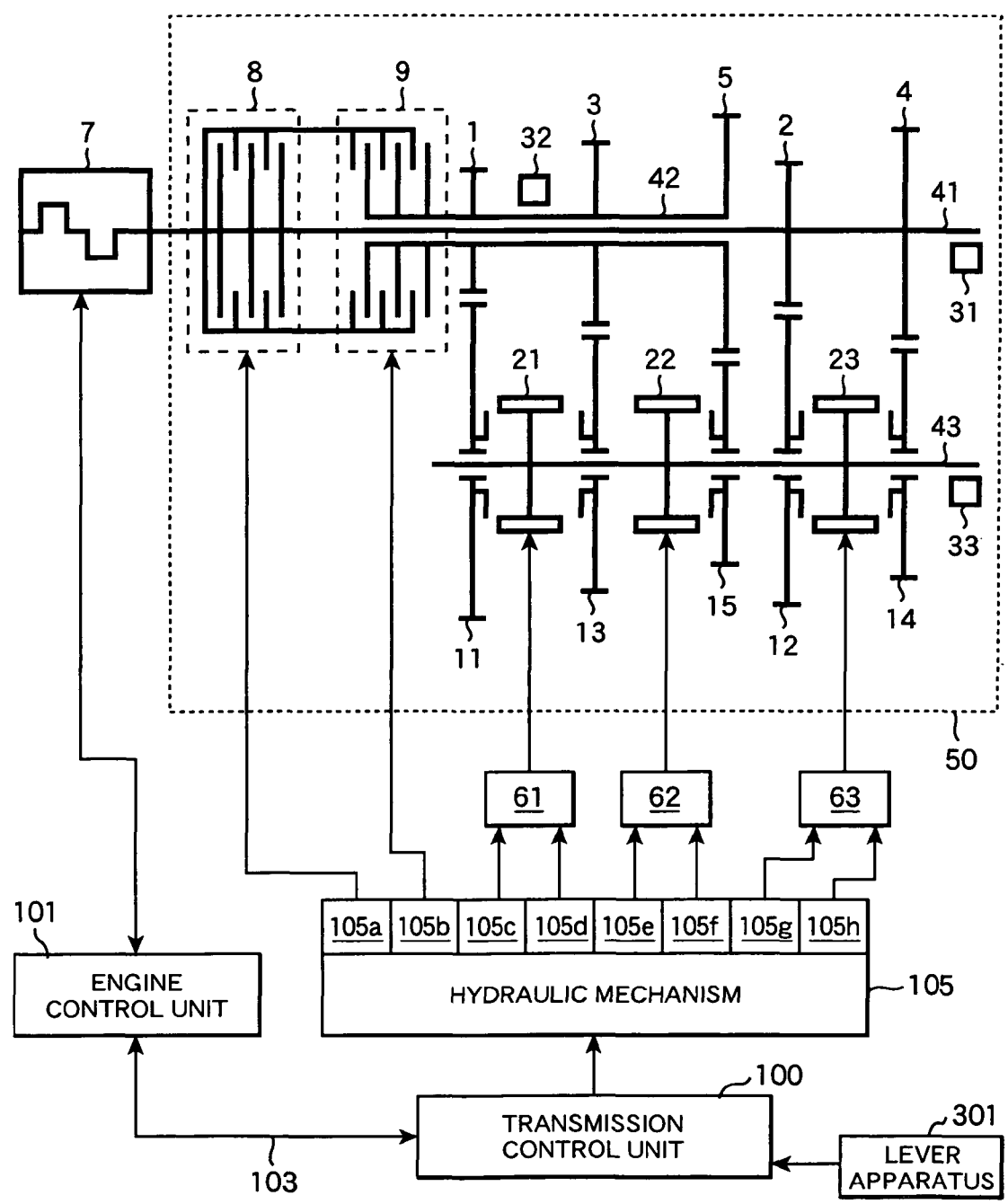
FIG. 1 is a skeleton diagram showing an example of a structure of a system of a vehicle having an automatic transmission control apparatus of a first embodiment of the present invention.

First, in reference to FIG. 1, an example of a structure of a vehicle having the automatic transmission control apparatus of this embodiment is explained.

FIG. 1 is a skeleton diagram showing an example of a structure of a system of the vehicle having the automatic transmission control apparatus of the first embodiment of the present invention.

An engine 7, which is a driving power source, includes: an engine speed sensor (not shown) for measuring a speed of the engine 7; an electronic throttle (not shown) for controlling engine torque; and a fuel injector (not shown) for injecting a fuel amount corresponding to an intake air amount. An engine control unit 101 can control torque of the engine 7 accurately by controlling, e.g., an intake amount, a fuel amount, and an ignition time. There is an intake port injection type fuel injector which injects a fuel to an intake port or a cylinder injection type fuel injector which injects a fuel into a cylinder directly. In this embodiment, a choice between an intake port fuel injection type engine or a cylinder fuel injection type engine may be decided from the advantage of sparing on fuel consumption and having a high exhaust capability in comparing driving ranges (ranges determined by engine torque and an engine speed) requested for these engines. As a driving power source, in addition to a gasoline engine, a diesel engine, a natural gas engine, a motor, and the like may be used.

An automatic transmission 50 includes: a first clutch 8; a second clutch 9; a first input shaft 41; a second input shaft 42; an output shaft 43; a first drive gear 1; a second drive gear 2; a third drive gear 3; a forth drive gear 4; a fifth drive gear 5; a reverse drive gear (not shown); a first driven gear 11; a second driven gear 12; a third driven gear 13; a forth driven gear 14; a fifth driven gear 15; a reverse drive gear (not shown); a first synchromesh 21; a second synchromesh 22; a third synchromesh 23; a speed sensor 31; a speed sensor 32; and a speed sensor 33. By engaging and disengaging the first clutch 8, torque of the engine 7 can be transferred/cut off to the first input shaft 41. By engaging and disengaging the second clutch 9, a torque of the engine 7 can be transferred/cut off to the second input shaft 42. In this embodiment, a wet multiple disc clutch is used for the first clutch 8 and second clutch 9. A dry multiple disc clutch may be used. Every friction transfer mechanisms can be used. A structure using an electromagnetic powder clutch can be used.

The second input shaft 42 is made of a hollow type shaft. The input shaft 41 penetrates through the hollow type-second input shaft 42. In this structure, the first input shaft 41 can rotate relative to the second input shaft 42 in complete isolation.

The first drive gear 1, the third drive gear 3, the fifth drive gear 5, and the reverse drive gear (not shown) are fixed to the second input shaft 42. These gears and the second input shaft 42 can rotate freely relative to the first input shaft 41. The second drive gear 2 and the fourth drive gear 4 are fixed to the first input shaft 41, and can rotate freely together with the first shaft 42 relative to the second input shaft 42.

As means for detecting a speed of the first input shaft 41, the sensor 31 is provided. As means for detecting a speed of the second input shaft 42, the sensor 32 is provided.

The first driven gear 11, the second driven gear 12, the third driven gear 13, the forth driven gear 14, the fifth driven gear 15, and the reverse driven gear (not shown) are provided on the output shaft 43. The first driven gear 11, the second driven gear 12, the third driven gear 13, the forth driven gear 14, the fifth driven gear 15, and the reverse driven gear (not shown) are free to rotate with respect to the output shaft 43.

As means for a speed of the output shaft 43, the sensor 33 is provided.

The first drive gear 1 is meshed with the first driven gear 11. The second drive gear 2 is meshed with the second driven gear 12. The third drive gear 3 is meshed with the third driven gear 13. The forth drive gear 4 is meshed with the forth driven gear 14. The fifth drive gear 5 is meshed with the fifth driven gear 15. The reverse drive gear (not shown), an idler gear (not shown), and the reverse driven gear (not shown) are engaged with each other.

A first synchromesh 21, which can engage the first driven gear 11 with the output shaft 43 and can engage the third driven gear 13 with the output shaft 43 in a selective manner, is provided between the first driven gear 11 and third driven gear 13.

A third synchromesh 23, which can engage the second drive gear 12 with the output shaft 43 and can engage the forth driven gear 14 with the output shaft 43 in a selective manner, is provided between the second driven gear 12 and forth driven gear 14.

A second synchromesh 22 which can engage the fifth driven gear 15 with the output shaft 43 is provided between the fifth driven gear 15 and the third driven gear 13.

The transmission control unit 100 controls currents of an electromagnetic valve 105c and an electromagnetic valve 105d provided to a hydraulic mechanism 105 to control a position or load of the first synchromesh 21 via a hydraulic piston (not shown) and a shift fork (not shown) provided in a shift actuator 61. Thereby, the first synchromesh 21 can be selectively engaged with the first driven gear 11 or the third driven gear 13. Accordingly, torque of the second input shaft 42 can be transferred to the output shaft 43 via the first synchromesh 21 and selective meshed gear. For example, when the current of the electromagnetic valve 105d is increased, the shift actuator 61 exerts its load on the first synchromesh 21 to move the synchromesh 21 toward the first driven gear 11. When the current of the electromagnetic valve 105c is increased, the shift actuator 61 exerts its load on the first synchromesh 21 to move the synchromesh 21 toward the third driven gear 13. A position sensor 61a (not shown) for measuring a position of the first synchromesh 21 is provided to the shift actuator 61.

The transmission control unit 100 controls currents of an electromagnetic valve 105e and electromagnetic valve 105f provided to the hydraulic mechanism 105. Then, a position or load of the second synchromesh 22 is controlled via a hydraulic piston (not shown) and a shift fork (not shown) provided in a shift actuator 62 to engage the second synchromesh 22 with the fifth driven gear 15. Accordingly, torque of the second input shaft 42 can be transferred to the output shaft 43 via the second synchromesh 22 and selective meshed gear. A position sensor 62a (not shown) for measuring a position of the second synchromesh 22 is provided to the shift actuator 62.

The transmission control unit 100 controls currents of an electromagnetic valve 105g and an electromagnetic valve 105h provided to the hydraulic mechanism 105. Then, a position or load of the third synchromesh 23 is controlled via a hydraulic piston (not shown) and a shift fork (not shown) provided in a shift actuator 63 to selectively engage the third synchromesh 23 with the second driven gear 12 or the forth driven gear 14. Accordingly, rotation torque of the first input shaft 41 can be transferred to the output shaft 43 via the third synchromesh 23 and selective meshed gear. A position sensor 63a (not shown) for measuring a position of the third synchromesh 23 is provided to the shift actuator 63.

As described above, the torque of the transmission input shaft 41 is transferred to the transmission output shaft 43 via a first change gear (the first drive gear 1 and the first driven gear 11), or a second change gear (the second drive gear 2 and the second driven gear 12), or a third change gear (the third drive gear 3 and the third driven gear 13), or a forth change gear (the forth drive gear 4 and the forth driven gear 14), or a fifth change gear (the fifth drive gear 5 and the fifth driven gear 15). Then, the torque is transferred to an axle shaft (not shown) via a differential gear (not shown) connected to the transmission output shaft 43.

The transmission control unit 100 controls a current of an electromagnetic valve 105a provided to the hydraulic mechanism 105 to control a pressure plate (not shown) provided in the first clutch 8. Then, the transfer torque of the first clutch 8 is controlled.

The transmission control unit 100 controls a current of an electromagnetic valve 105b provided to the hydraulic mechanism 105 to control a pressure plate (not shown) provided in the second clutch 9. Then, the transfer torque of the second clutch 9 is controlled.

A range position signal showing a position of a shift lever such as a P-range, R-range, N-range, or D-range is inputted from a lever apparatus 301 to the transmission control unit 100.

The transmission control unit 100 and the engine control unit 101 transmit and receive information to and from each other by use of communications means 103.

The shift actuator 61 is controlled by the electromagnetic valve 105c and the electromagnetic valve 105d to mesh the first synchromesh 21 with the first driven gear 11. Then, the second clutch 9 is engaged. Accordingly, running at a first change gear position is achieved.

The shift actuator 63 is controlled by the electromagnetic valve 105g and the electromagnetic valve 105h to mesh the third synchromesh 23 with the second driven gear 12. Then, the first clutch 8 is engaged. Accordingly, running at a second change gear position is achieved.

The shift actuator 61 is controlled by the electromagnetic valve 105c and the electromagnetic valve 105d to mesh the first synchromesh 21 with the third driven gear 13. Then, the second clutch 9 is engaged. Accordingly, running at a third change gear position is achieved.

The shift actuator 63 is controlled by the electromagnetic valve 105g and the electromagnetic valve 105h to mesh the third synchromesh 23 with the forth driven gear 14. Then, the second clutch 8 is engaged. Accordingly, running at a forth change gear position is achieved.

The shift actuator 62 is controlled by the electromagnetic valve 105e and the electromagnetic valve 105f to mesh the second synchromesh 22 with the fifth driven gear 15. Then, the second clutch 9 is engaged. Accordingly, running at a fifth change gear position is achieved.

The shift actuator 62 is controlled by the electromagnetic valve 105e and the electromagnetic valve 105f to mesh the second synchromesh 22 with the reverse driven gear (not shown). Then, the second clutch 9 is engaged. Accordingly, running at a reverse change gear position is achieved.

For example, an up-shift from the first change gear position to the second change gear position is achieved as follows. At the time of performing the up-shift, the shift actuator 61 is controlled by the electromagnetic valve 105c and electromagnetic valve 105d; the first synchromesh 21 is meshed with the first driven gear 11; and the second clutch 9 is engaged. Under such a situation, the actuator 63 is controlled by the electromagnetic valve 105g and the electromagnetic valve 105h. The third synchromesh 23 is meshed with the second driven gear 12. Then the first clutch 8 is gradually engaged, and the second clutch 9 is gradually disengaged.

In this embodiment, the hydraulic mechanism using the electromagnetic valves and hydraulic piston is used as a mechanism for operating the first mesh type mechanism 21, the second mesh type mechanism 22, and the third mesh type mechanism 23. Instead of the electromagnetic valves and hydraulic piston, an electrical motor and a reduction gear may be used, and an electrical motor and a drum may be used. Other mechanisms can be used for controlling the mesh type mechanisms 21, 22, and 23. As the electrical motor, the so-called direct-current motor in which a magnet is fixed and a coil rotates and a permanent magnet synchronous motor in which a coil is fixed and a magnet rotates may be used. Various types of motors are applicable.

In this embodiment, the hydraulic mechanism using the electromagnetic valves is used for operating the first clutch 8 and the second clutch 9. An electrical motor and a reduction gear may be used instead of the hydraulic mechanism. A pressure plate of a clutch may be controlled by an electromagnetic coil. Other mechanism can be used for controlling the first clutch 8 and second clutch 9.

Figure 2:
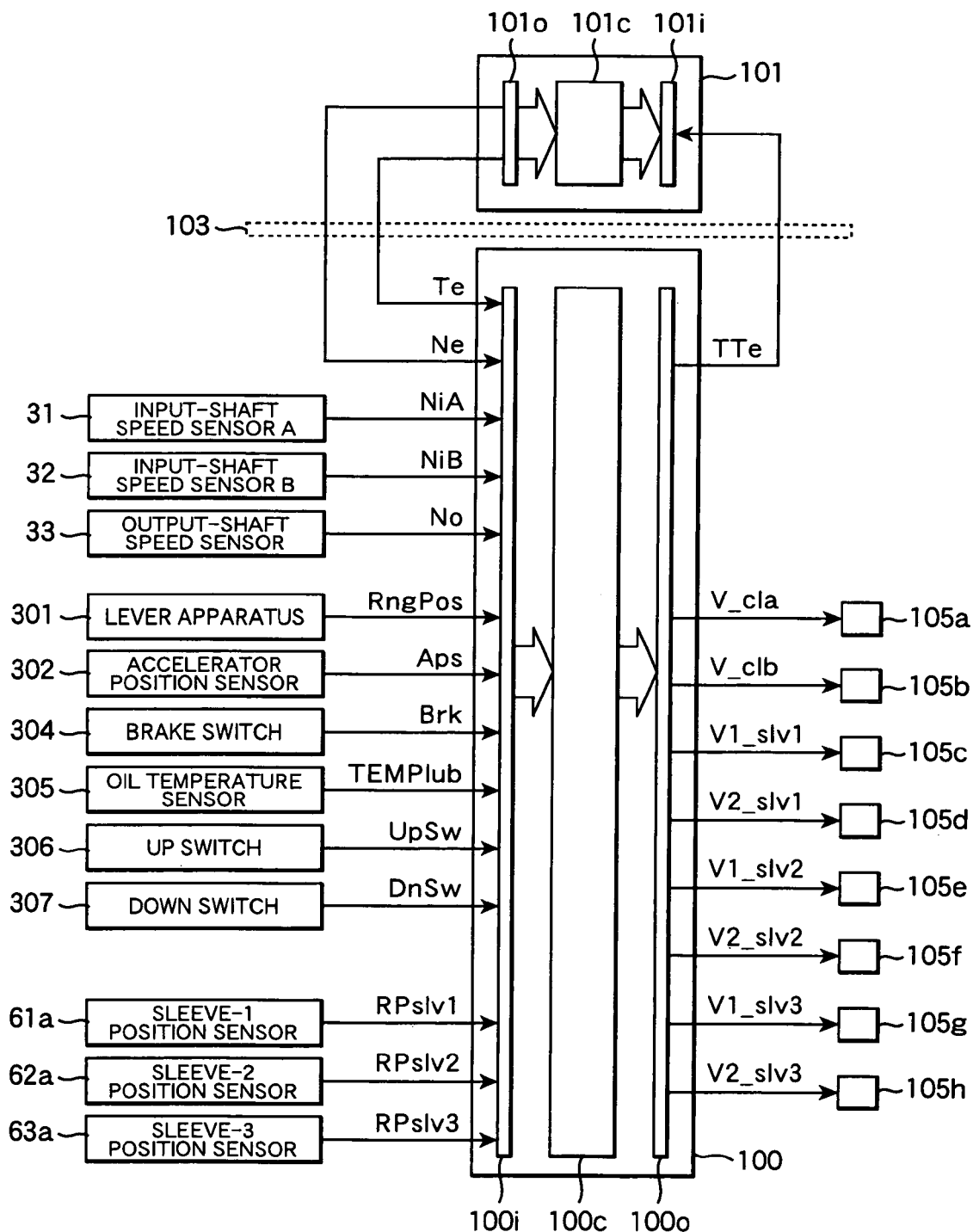
FIG. 2 is a block diagram showing a relationship of input and output signals between a transmission control unit and engine control unit in the vehicle having the automatic transmission control apparatus of the first embodiment of the present invention.

Next, in reference to FIG. 2, a relationship of input and output signals between the transmission control unit 100 in a vehicle having the automatic transmission control apparatus of this embodiment and the engine control unit 101, is explained.

FIG. 2 is a block diagram showing the relationship of input and output signals between the transmission control unit and the engine control unit in the vehicle having the automatic transmission control apparatus of the first embodiment of the present invention.

The transmission control unit 100 is comprised of an input section 100*i*, an output section 100*o*, and a computer 100*c*. The engine control unit 101 is comprised of the input section 101*i*, the output section 101*o*, and the computer 101*c*.

An engine torque instruction value TTe is transmitted from the transmission control unit 100 to the engine control unit 101 by use of the communications means 103. To achieve the engine torque instruction value TTe, the engine control unit 101 controls, e.g., an intake air amount, a fuel amount, and an ignition time (not shown) of the engine 7. Engine torque measuring means (not shown) for engine torque, which is an input torque to the transmission, is provided in the engine control unit 101. The engine control unit 101 computes a speed Ne of the engine 7, and engine torque Te generated by the engine 7. The engine control unit 101 transmits the speed Ne and engine torque Te to the transmission control unit 100 by use of the communications means 103. A torque sensor can be used as the engine torque measuring means. Alternatively, predicting means using parameters of the engine, such as a pulse width of the injector, a pressure in the intake air pipe, and an engine speed, may be used as the engine torque measuring means.

To achieve a desired first-clutch transfer torque, the transmission control unit 100 controls a voltage V_cla applied to the electromagnetic valve 105*a*. Accordingly, a current of the electromagnetic valve 105*a* is controlled to engage/disengage the first clutch 8.

To achieve a desired second-clutch transfer torque, the transmission control unit 100 controls a voltage V_clb applied to the electromagnetic valve 105*b*. Accordingly, a current of the electromagnetic valve 105*b* is controlled to engage/disengage the second clutch 9.

To achieve a desired position of the first synchromesh 21, the transmission control unit 100 controls voltages V1_slv1 and V2_slv1 applied to the electromagnetic valves 105*c* and 105*d*. Accordingly, currents of the electromagnetic valves 105*c* and 105*d* are controlled to engage/disengage the first synchromesh 21 with/from the first driven gear 11 or the third driven gear 13.

To achieve a desired position of the second synchromesh 22, the transmission control unit 100 controls voltages V1_slv2 and V2_slv2 applied to the electromagnetic valves 105*e* and 105*f*. Accordingly, currents of the electromagnetic valves 105*e* and 105*f* are controlled to engage/disengage the second synchromesh 22 with/from the fifth driven gear 15 or the reverse driven gear.

To achieve a desired position of the third synchromesh 23, the transmission control unit 100 controls voltages V1_slv3 and V2_slv3 applied to the electromagnetic valves 105*g* and 105*h*. Accordingly, currents of the electromagnetic valves 105*g* and 105*h* are controlled to engage/disengage the third synchromesh 23 with the second driven gear 12 or the forth driven gear 14.

A current sensing circuit (not shown) is provided to the transmission control unit 100. A voltage output from the control unit 100 to the electromagnetic valve from is controlled so that a current of each electromagnetic valve reaches a target current. Then, the current of each electromagnetic valve is controlled.

A first input-shaft speed NiA from the speed sensor 31, a second input-shaft speed NiB from the speed sensor 32, and an output-shaft speed No from the speed sensor 33 are inputted to the transmission control unit 100. A range position signal RngPos showing a shift lever position such as a P-range, R-range, N-range, and D-range from the lever apparatus 301, an accelerator pedal position Aps from an accelerator position sensor 302, and an ON/OFF signal Brk from a brake switch 304 for detecting whether a brake pedal is pressed, are inputted to the transmission control unit 100.

In this embodiment, the automatic transmission apparatus also has the so-called manual mode function in which a driver manually directs an up-shift/down-shift. ON/OFF signals UpSw and DnSw are inputted from an up switch 306 and a down switch 307 to the transmission control unit 100.

A lubricant temperature TEMPlub is inputted from a oil temperature sensor 305 for measuring a temperature of a lubricant in the transmission 50 to the transmission control unit 100.

A sleeve-1 position RPslv1, a sleeve-2 position Rpslv2, and a sleeve-3 position RPslv3 showing a stroke position of the first synchromesh 21, a stroke position of the second synchromesh 22, and a stroke position of the third synchromesh 23, respectively, are inputted from a sleeve-1 position sensor 61*a*, a sleeve-2 position sensor 62*a*, and a sleeve-3 position sensor 63*a*, respectively, to the transmission control unit 100.

For example, when a driver selects, e.g., a D-range from the shift ranges and presses an accelerator pedal, the transmission control unit 100 determines that the driver intends to start and accelerate the vehicle. For example, when a driver presses a brake pedal, the transmission control unit 100 determines that the driver intends to decelerate and stop the vehicle. Then the transmission control unit 100 sets the engine torque instruction value TTe, a first-clutch target transfer torque TTs1, and a second-clutch target transfer torque TTs2 to achieve the request of the driver.

The transmission control unit 100 sets a target change gear position (hereinafter "change gear position" is also called as "gear position" merely) in accordance with a vehicle speed Vsp and the accelerator pedal position Aps calculated from the output shaft speed No. Then, in order to execute shifting to the set target gear position, the transmission control unit 100 sets the engine torque instruction value TTe, the first-clutch target transfer torque TTs1, the second-clutch target transfer torque TTs2, a target sleeve-1 position TPslv1, a target sleeve-2 position TPslv2, and a target sleeve-3 position TPslv3.

To achieve the set first-clutch target transfer torque TTs1, second-clutch target transfer torque TTs2, target sleeve-1 position TPslv1, target sleeve-2 position TPslv2, and target sleeve-3 position TPslv3, the transmission control unit 100 outputs the voltages V_cla, V_clb, V1_slv1, V2_slv1, V1_slv2, V2_slv2, V1_slv3, and V2_slv3 applied to the electromagnetic valves 105a, 105b, 105c, 105d, 105e, 105f, 105g, and 105h.

In reference to FIGS. 3 to 10, concrete content of a control for the shift load by the automatic transmission control apparatus of this embodiment is explained.

Figure 3:
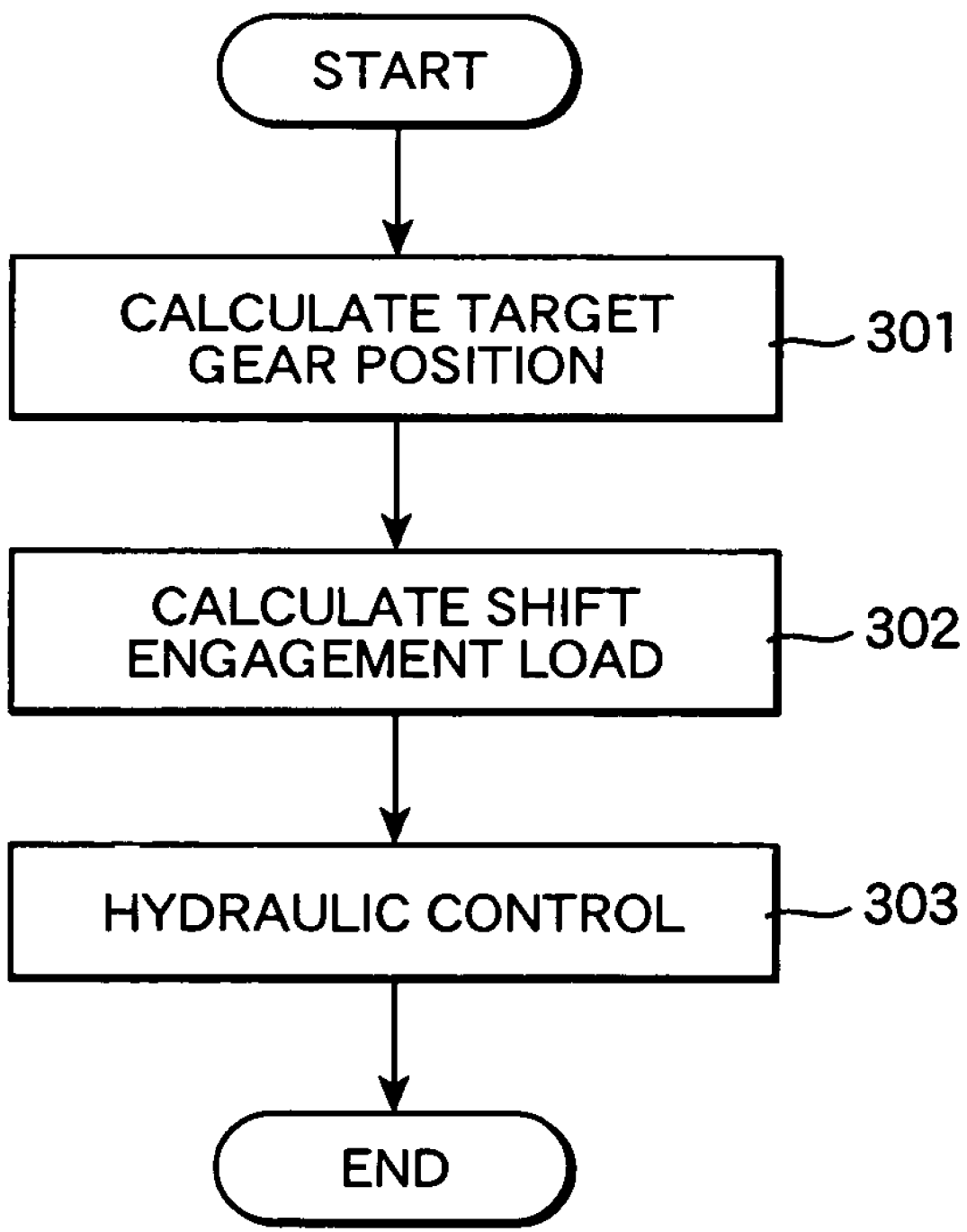
FIG. 3 is a flowchart showing an overview of content of a total control for a shift load control by the automatic transmission control apparatus of the first embodiment of the present invention.

FIG. 3 is a flowchart showing an overview of the contents of the total control for the shift load by the automatic transmission control apparatus of the first embodiment of the present invention.

A shifting control flow includes Step 301 (target gear position calculation), Step 302 (shift engagement load calculation), and Step 303 (hydraulic control).

The contents of FIG. 3 is programmed in the computer 100c of the transmission control unit 100, and repeated in predetermined periods. Namely, the processes in the following Steps 301 to 303 are executed by the transmission control unit 100.

In Step 301 (target gear position calculation), the computer 100c determines operations to be executed at the present moment, such as a range selection operation, starting operation, and shifting operation, from the range position signal RngPos, up switch signal UpSw, down switch signal DnSw, accelerator pedal position signal Aps, vehicle speed signal Vsp, and brake ON/OFF signal Brk. Then, the computer 100c sets a target gear position tGP_nxt, which is a target value of a gear change position for a running vehicle, and a target standby gear change position tGP_stb, which is a target value of a gear position to be standby in preparation for the next shifting.

In Step 301 (target gear position calculation), the computer 100c also determines whether the automatic shifting mode or manual shifting mode is selected from the range position signal RngPos, up switch UpSw, and down switch DnSw. Furthermore, in Step 301 (target gear position calculation), the computer 100c determines whether the range position signal RngPos shows a range selection such as N→D, N→R, R→D, and D→R.

Figure 4:
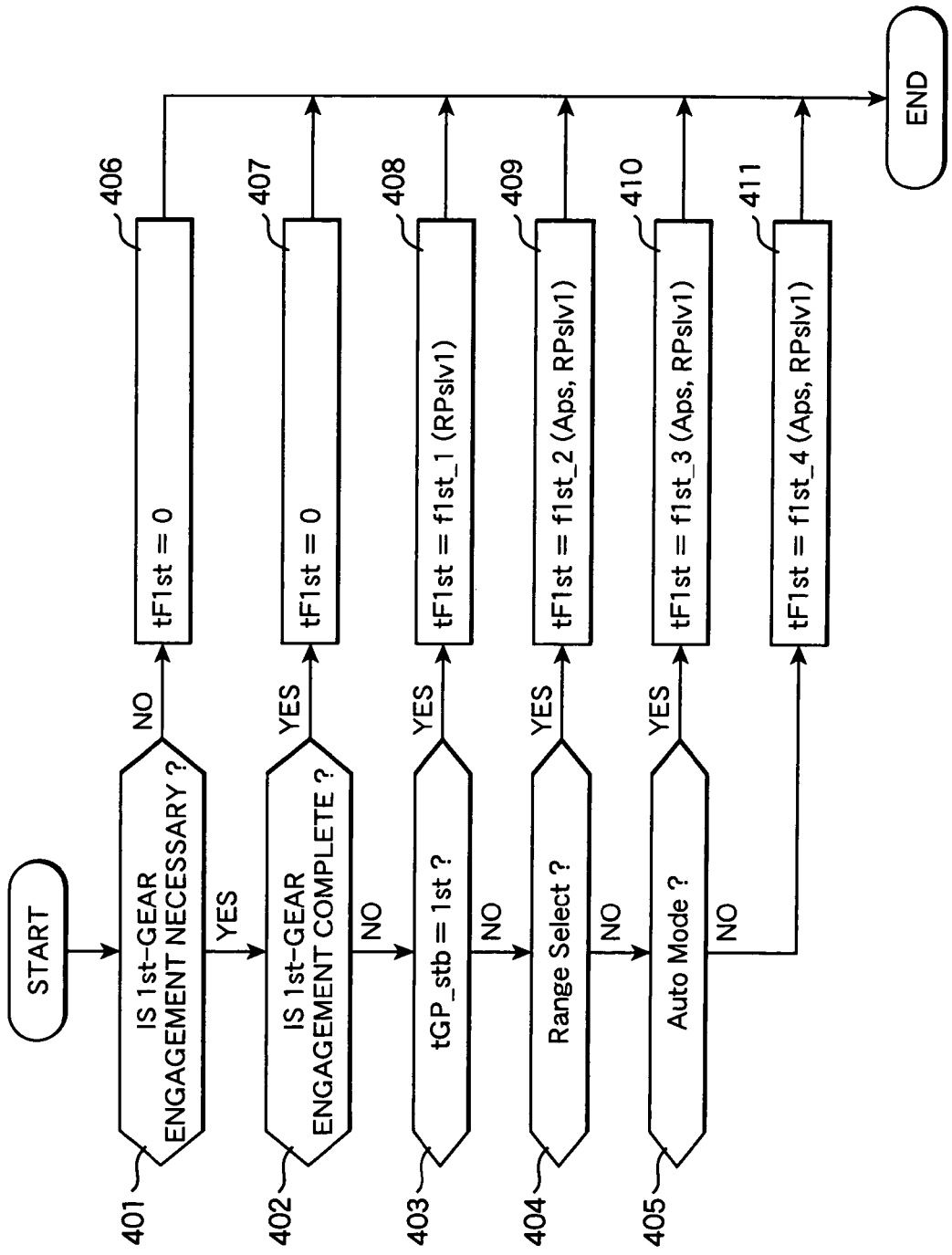
FIG. 4 is a flowchart showing an overview of content of a control for a shift engagement load calculation in the shift load control by the automatic transmission control apparatus of the first embodiment of the present invention.

Next, in Step 302, the shift engagement load is calculated. Next, in Step 303, the hydraulics is controlled based on the shift engagement load. Details in Step 302 (shift engagement load calculation) are shown in FIGS. 4, 5. Details in Step 303 (hydraulic control) are shown in FIG. 6.

Next, in reference to FIGS. 4, 5, Step 302 (shift engagement load calculation) of FIG. 3 is explained in detail.

FIG. 4 is a flowchart showing an overview of contents of a control for the shift engagement load calculation in the shift load control by the automatic transmission control apparatus of the first embodiment of the present invention.

FIG. 5 is an explanatory diagram for a map used for the shift engagement load calculation in the shift load control by the automatic transmission control apparatus of the first embodiment of the present invention.

FIGS. 4 and 5 although show a flowchart for setting a 1st gear engagement load tF1st when a 1st gear is selected, as one example, processes of FIGS. 4, 5 are actually executed in selected each gear position (1st gear to fifth gear, reverse gear). That is, instead of the case of selecting the 1st gear engagement load tF1st, when anyone among 2nd gear engagement load tF2nd, a third gear engagement load tF3rd, a forth gear engagement load tF4th, a fifth gear engagement load tF5th, and a reverse gear engagement load tFRev are selected, the gear engagement load is calculated.

In Step 401, the computer 100c determines whether an engagement of the 1st gear is needed. When the engagement of the 1st gear is not needed, the flow goes to Step 406, and the flow ends. When the 1st gear is engaged, the flow goes to Step 402.

Next, in Step 402, the computer 100c determines whether the 1st gear has been engaged. When he 1st gear has been engaged, the flow goes to Step 407, the 1st-gear engagement load tF1st is set to 0, and the flow ends.

Next, in Step 403, the computer 100c determines whether the 1st gear is in a standby gear position. When a target standby gear position, which is a target value for a gear position to be standby in preparation for the next shifting, is set, namely, when the 1st gear is engaged in advance in preparation for the next shifting, the flow goes to Step 408. Then, the 1st-gear engagement load tF1st is set by a function f1st_1 using the sleeve-1 position RPslv1 as an input. As described in FIG. 5(A), the function f1st_1 is preferably a relatively small value when the sleeve-1 position RPslv1 is small (near the neutral). The function f1st_1 is preferably a relatively large value when the sleeve-1 position RPslv1 is in a middle range (near the synchronous position). The function f1st_1 is preferably a relatively small value when the sleeve-1 position RPslv1 is large (near the mesh position).

The setting of the function f1st_1, namely, an engagement load of the synchromesh in the case of a pre-shift based on a prediction result, is a value such that the 1st gear can be engaged, and is as small a value as possible, in accordance with durability of the synchromesh. Namely, a maximum value of the engagement load of the synchromesh is smaller than that in the case of a connection of the synchromesh under the other condition different from the prediction result. Namely, a maximum value tF1st-max of the engagement load of the synchromesh is set smaller than the maximum value of the engagement load of the synchromesh in the case of the connection of the synchromesh in accordance with other conditions different from the prediction result. As a result, deterioration of the synchromesh in the pre-shift can be kept down.

When the 1st gear is not in the standby gear position, namely, when the target gear position tGP_nxt, which is a target value of a gear position of a running vehicle, is at the 1st gear, and the standby (wait) of the 1st gear continues, the flow goes to Step 404.

In Step 404, it is determined whether the range selection is executed. When it is determined that the range selection is executed in Step 301 (target gear position calculation), namely, when the 1st gear is engaged in, e.g., the N→D range selection and R→D range selection, the flow goes to Step 409. Then, the 1st-gear engagement load tF1st is set by a function f1st_2 using the sleeve-1 position RPslv1 and accelerator pedal position Aps as inputs. As shown in FIG. 5(B), basically as well as in FIG. 5(A), the function f1st_2 is a relatively small value when the sleeve-1 position RPslv1 is preferably small (near the neutral); the function f1st_2 is preferably a relatively large value when the sleeve-1 position RPslv1 is in the middle range (near the synchronous position); and the function f1st_2 is preferably a relatively small value again when the sleeve-1 position RPslv1 is large (near the mesh position). The function f1st_2 is preferably set to a relatively small value to keep down generation of shock due to the gear engagement when the accelerator pedal position Aps is small. The function f1st_2 is preferably set to a relatively large value to end the engagement of the 1st gear soon when the accelerator pedal position Aps is large, namely, when the accelerator pedal position Aps corresponds to a racing range selection.

Figure 5A:
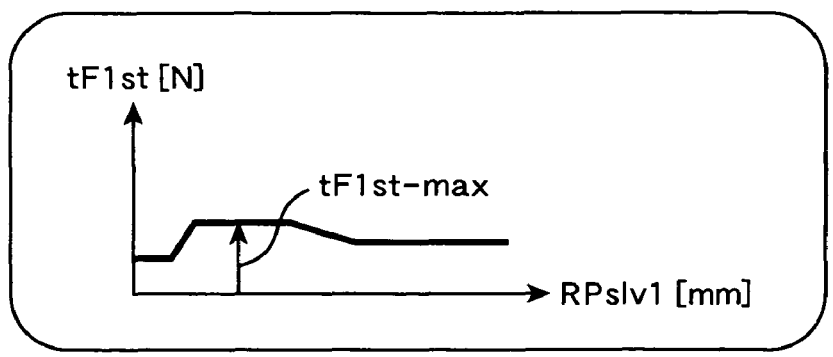
FIG. 5 are explanatory diagrams of maps used in the shift engagement load calculation in the shift load control by the automatic transmission control apparatus of the first embodiment of the present invention.
Figure 5B:
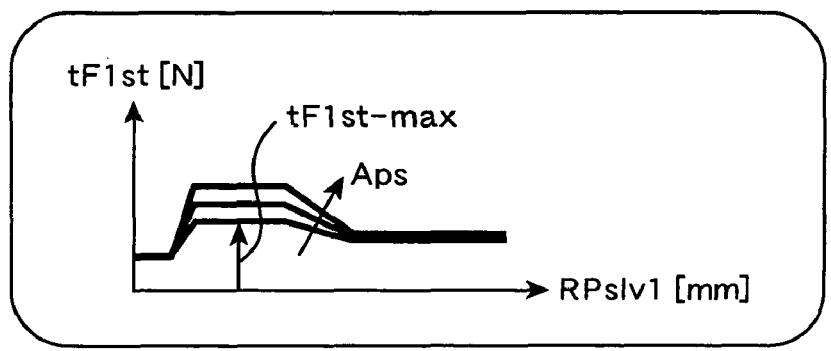
Figure 6:
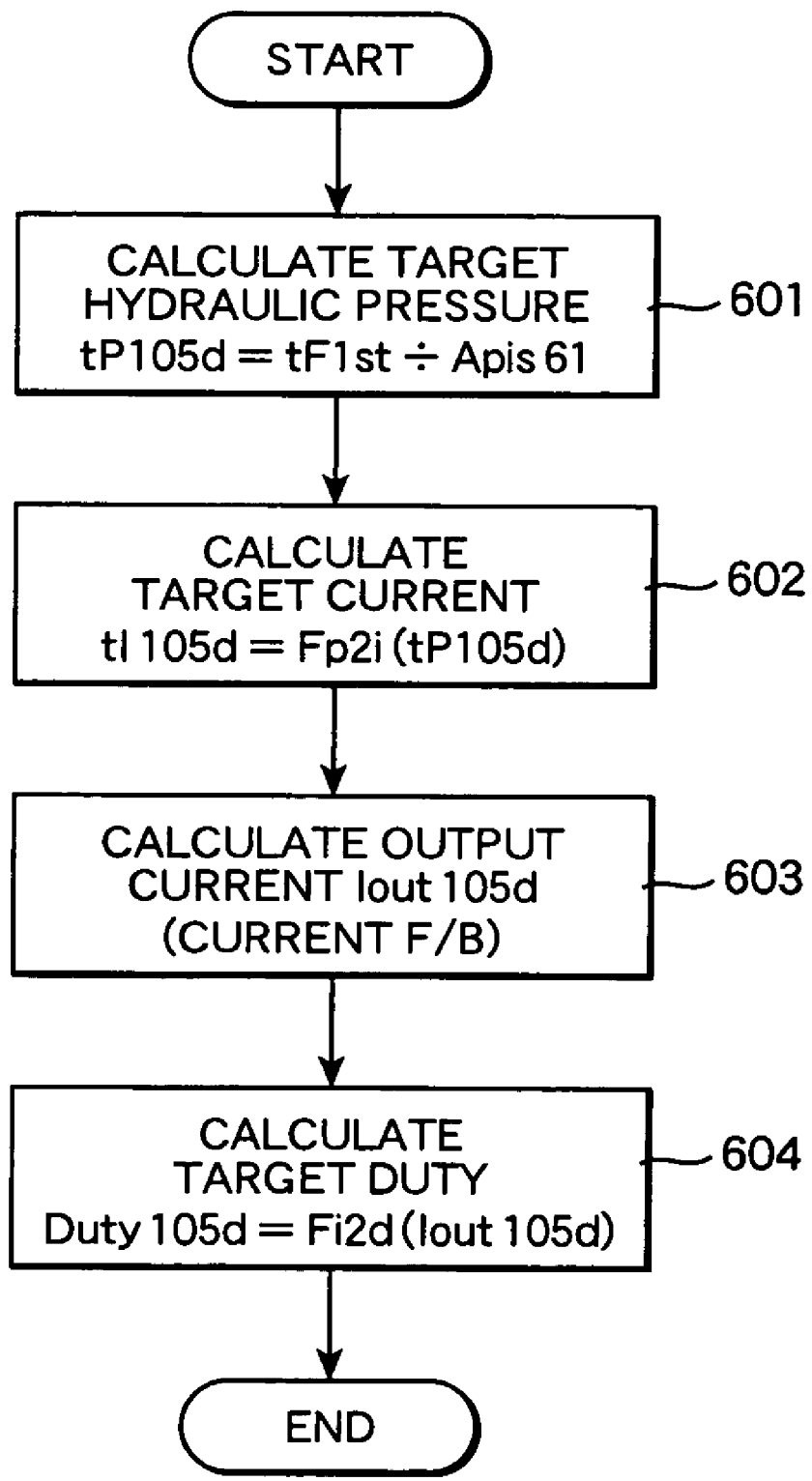
FIG. 6 is a flowchart showing an overflow of content of a control for a hydraulic control in the shift load control by the automatic transmission apparatus of the first embodiment of the present invention.

The function f1st_2 is preferably a relatively large value in a range where the sleeve-1 position RPslv1 is in the middle range (near the synchronous position) in comparison to the case of FIG. 5(A). The maximum value tF1st-max of the engagement load of the synchromesh is set smaller than the maximum value of the synchromesh when the engagement of the synchromesh is done in accordance with other conditions different from the prediction result. As a result, deterioration of the synchromesh in the case of the pre-shift can be kept down.

When it is determined that the range selection is not executed in Step 404, the flow goes to Step 405.

Figure 5C:
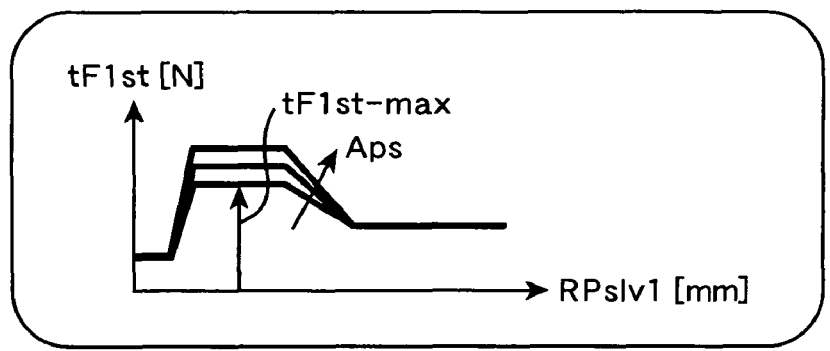

In Step 405, it is determined whether the automatic shifting mode is selected. When it is determined that the automatic shifting mode is selected in Step 301 (target gear position calculation), the flow goes to Step 410. Then, the first gear engagement load tF1st is set by a function f1st_3 using the sleeve-1 position RPslv1 and accelerator pedal position Aps as inputs. As shown in FIG. 5(C), basically as well as in FIG. 5(A), FIG. 5(B), the function f1st_3 is preferably a relatively small value when the sleeve-1 position RPslv1 is small (near the neutral). The function f1st_3 is preferably a relatively large value when the sleeve-1 position RPslv1 is in the middle range (near the synchronous position). The function f1st_3 is preferably a relatively small value again when the sleeve-1 position RPslv1 is large (near the mesh position). The function f1st_3 is preferably set totally larger than those of FIGS. 5(A), 5(B). As a trend on its own in this case, when the accelerator pedal position Aps is small, the function f1st_3 is preferably a relatively small value to keep down generation of shock due to the gear engagement. When the accelerator pedal position Aps is large, the function f1st_3 is preferably a relatively large value because to take account of a response and to end the engagement of the 1st gear speedily. As well to this case, the maximum value tF1st-max of the engagement load of the synchromesh is set smaller than the maximum value of the engagement load of the synchromesh when the connection of the synchromesh is done in accordance with other conditions different from the prediction result. As a result, deterioration of the synchromesh in case of the pre-shift can be kept down.

When it is determined that the automatic shifting mode is not selected in Step 405, the flow goes to Step 411. Then, the 1st-gear engagement load tF1st is set by a function f1st_4 using the sleeve-1 position RPslv1 and accelerator pedal position Aps as inputs.

Figure 5D:
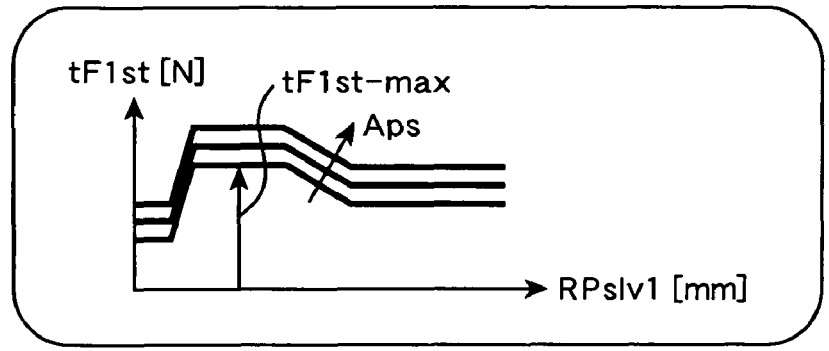

As shown in FIG. 5(D), basically as well as in FIG. 5(A), FIG. 5(B), and FIG. 5(C), when the sleeve-1 position RPslv1 is small (near the neutral), the function fist_4 is preferably a relatively small value. When the sleeve-1 position RPslv1 is in the middle range (near the synchronous position), the function f1st_4 is preferably a relatively large value. When the sleeve-1 position RPslv1 is large (near the mesh position), the function f1st_4 is preferably a relatively large value. In the manual shifting mode, as a response is usually more taken into account than in the automatic shifting mode, the function f1st_4 is preferably set to a value totally larger than those of FIGS. 5(A), 5(B), and 5(C) to end the engagement of the 1st gear speedily. Incidentally as a trend on its own in this case, when the accelerator pedal position Aps is small, the function f1st_4 is preferably a rather small value to keep down shock due to the gear engagement. When the accelerator pedal position Aps is large, the function f1st_4 is preferably a large value to end the engagement of the 1st gear speedily in consideration of a response.

As well to this case, the maximum value tF1st-max of the engagement load of the synchromesh is set smaller than the maximum value of the engagement load of the synchromesh when the connection of the synchromesh is done in accordance with other conditions different from the prediction result. As a result, deterioration of the synchromesh in case of the pre-shift can be kept down.

In the above explanation, the engagement although load is set by the function using the sleeve position and accelerator pedal position as inputs, the engagement load may be adjustable by using a speed (vehicle speed).

The engagement load may be set in accordance with a differential speed when the engagement of the synchromesh starts and a target engagement time of the synchromesh. Furthermore, a target time may be set in accordance with each state in the structure of FIG. 4.

In this case, a feedback control system, in which a target sleeve position is set and a deviation between the target sleeve position and a real sleeve position is used, may be adopted. In the feedback control system, a feedback gain may be set in accordance with each state in the structure of FIG. 4.

Incidentally, a feedback control system, in which a target sleeve position is set and a deviation between the target sleeve position and a sleeve position is used, may be adopted. In the feedback control system, the target sleeve position may be set in accordance with each state in the structure of FIG. 4.

In the feedback control system in which the target sleeve position is set and the deviation between the target sleeve position and a sleeve position, a rate of change of a target position maybe set in accordance with each state in the structure of FIG. 4.

Additionally, in the automatic shifting mode in a vehicle having, e.g., a so-called power switch or a sport mode switch, a case for the power switch and a case for the sport mode switch maybe added to FIG. 4, and setting of a shift load maybe changed.

The functions f1st_1, f1st_2, f1st_3, and f1st_4 can be preferably set differently for each gear shift position.

Next, in reference to FIG. 6, Step 303 (hydraulic control) of FIG. 3 is explained in detail.

FIG. 6 is a flowchart showing an overview of contents of a hydraulic control in the shift load by the automatic transmission control apparatus of the first embodiment of the present invention.

FIG. 6 is a flowchart for calculating a duty ratio of a voltage applied to the electromagnetic valve 105d, for example, in the case of the 1st gear. In the process of FIG. 6, the duty ratio is calculated for each gear (1st gear to fifth gear, reverse gear). A duty ratio of an applied voltage for the electromagnetic valve 105h is calculated in the case of the second gear. A duty ratio of an applied voltage for the electromagnetic valve 105c is calculated in the case of the 3rd gear. A duty ratio of an applied voltage for the electromagnetic valve 105g is calculated in the case of the 4th gear. A duty ratio of an applied voltage for the electromagnetic valve 105e is calculated in the case of the 5th gear. A duty ratio of an applied voltage for the electromagnetic valve 105f is calculated in the case of the reverse gear.

In Step 601, the computer 100c sets a target hydraulic pressure tP105d of the electromagnetic valve 105d. The target hydraulic pressure tP105d is calculated by dividing the 1st-gear engagement load tF1st set in FIG. 4 by a pressure receiving area Apis61 of the hydraulic piston provided to the shift actuator 61.

Next, in Step 602, the target hydraulic pressure tP105d set in Step 601 is converted to a target current of the electromagnetic valve 105d. The target current tI105d is calculated by a function Fp2i using the target hydraulic pressure tP105d as an input. The function Fp2i is set from a relationship between a current of the electromagnetic valve 105d and a hydraulic characteristic.

Next, in Step 603, by use of a deviation between the target current tI105d set in Step 602 and an actual current detected by the current detection circuit, feedback correction value is obtained. Additionally, by multiplying the feedback correction value by correction coefficient for a voltage fluctuation, temperature change, and the like, an output current Iout 105d is calculated.

Next, in Step 604, the output current Iout 105d set in Step 603 is converted to a duty ratio of an applied voltage. By use of a function Fi2d using the output current Iout 105das an input, a target duty ratio Duty105d is calculated. The function Fi2d is set from a sum of electrical resistances such as an electric characteristic, a harness, and a connector of the electromagnet valve 105d.

Next, in reference to FIG. 7, an example of a first shift control by the control shown in FIGS. 3 to 6 is explained.

FIG. 7 is a time chart showing an example of the first shift control in a vehicle having the automatic transmission control apparatus of the first embodiment of the present invention. The example of this first shift control shows contents of the shift control when a target standby gear position, which is a target value of a gear to be standby in preparation for next shifting, is shifted from the 3rd gear to 1st gear.

FIG. 7(A) shows the target gear position tGP_nxt. FIG. 7(B) shows the standby gear position tGP_stb. FIG. 7(C) shows the 1st-gear engagement load tF1st. FIG. 7(D) shows the sleeve-1 position RPslv1. The 3rd shows an engagement position of the 3rd gear. The N shows a neutral position. The 1st shows a mesh position of the 1st gear. FIG. 7(E) shows a current of the electromagnetic valve 105d.

Before a time t1, the present target gear position tGP_nxt is in 2nd gear position as shown in FIG. 7(A), the target standby gear position tGP_stb is in 3rd gear position as shown in FIG. 7(B), the sleeve-1 position RPslv1 is in 3rd gear position as shown in FIG. 7(D). That is, it shows a situation when a vehicle is running in the 2nd gear, and the 3rd gear is standby in preparation for the next shifting.

When the target standby gear position tGP_stb shown in FIG. 7(B) is changed from the 3rd gear position to the 1st gear position in Step 301 (target gear position calculation) of FIG. 3 at the time t1, the electromagnetic valve 105d shown in FIG. 7(E) is controlled so that the sleeve-1 position RPslv1 shown in FIG. 7(D) moves from the 3rd gear position (the 3rd engagement position) to the neutral position.

When it is determined that the sleeve-1 position RPslv1 shown in FIG. 7(D) is at the neutral position N at a time t2, it is determined in Step 401 of FIG. 4 that an engagement of the 1st gear is necessary. After Steps 402 and 403, Step 408 of FIG. 4 is executed. In accordance with the setting of FIG. 5(A) and with durability of the first synchromesh 21, the 1st-gear engagement load tF1st shown in FIG. 7(C) is set to a small value (tF1st-max), such that the 1st gear can be engaged, and deterioration of the first synchromesh 21 is kept down. A current (FIG. 7(E)) of the electromagnetic valve 105d is controlled in Steps 601, 602, 603, and 604 of FIG. 6. From the time t2 to a time t3, the sleeve-1 position RPslv1 shown in FIG. 7(D) moves from the neutral position N to the 1st of the 1st-gear engagement position. It is determined in Step 402 of FIG. 4 that the 1st gear has been engaged at a time t4 at which a predetermined time has elapsed since the time t3 at which the sleeve-1 position RPslv1 shown in FIG. 7(D) has reached the 1st-gear engagement position. Then, Step 407 is executed, the 1st-gear engagement load tF1st shown in FIG. 7(C) is set to zero, and the current (FIG. 7(E)) of the electromagnetic valve 105d becomes zero.

Next, in reference to FIG. 8, an example of a second gear shift control by the control shown in FIGS. 3 to 6. FIG. 8 is a time chart showing the example of the second gear shift control in a vehicle having the automatic control apparatus of the first embodiment of the present invention. The example of this second gear shifting shows that the vehicle is running in the 2nd gear, the 3rd gear is standby in preparation for the next shifting, and a driver directs a down shift from the 2nd gear to 1st gear in the manual mode.

Times of the horizontal axis in FIG. 8 are the same as ones in FIG. 7. The vertical axes in FIGS. 8(A) to (E) are the same as ones in FIGS. 7(A) to (E).

Before the time t1, the target gear position tGP_nxt is in 2nd gear position as shown in FIG. 8(A), the target standby gear position tGP_stb is in 3rd gear position as shown in FIG. 8(B), the sleeve-1 position RPslv1 is in an engagement position of the 3rd gear position as shown in FIG. 8(D). That is, it shows a situation when a vehicle is running in the 2nd gear, and the 3rd gear is standby in preparation for the next shifting.

When a driver operates the down switch 307 so that the target gear position tGP_nxt shown in FIG. 8(A) is changed from the 2nd gear position to the 1st gear position in Step 301 (target gear position calculation) of FIG. 3 at the time t1, the electromagnetic valve 105d shown in FIG. 8(E) is controlled so that the sleeve-1 position RPslv1 shown in FIG. 8(D) moves from the 3rd-gear engagement position to the neutral position N.

When it is determined that the sleeve-1 position RPslv1 shown in FIG. 8(D) is in the neutral position at the time t2, it is determined in Step 401 of FIG. 4 that an engagement of the 1st gear is necessary. After Steps 402 to 405, Step 411 of FIG. 4 is executed. In accordance with the setting of FIG. 5(D), the 1st-gear engagement load tF1st shown in FIG. 8(C) is set to a totally rather large value (tF1st-max) under taking account of a response of the manual shifting mode. A current (FIG. 8(E)) of the electromagnetic valve 105d is controlled in Steps 601, 602, 603, and 604 of FIG. 6. From the time t2 to the time t3, the sleeve-1 position RPslv1 shown in FIG. 8(D) moves from the neutral position N to the 1st gear engagement position within a shorter time than that of FIG. 7. It is determined in Step 402 of FIG. 4 that the 1st gear has been engaged at the time t4 when a predetermined time has elapsed since the time t3. The time t3 is one when the sleeve-1 position RPslv1 shown in FIG. 8(D) has reached the 1st-gear engagement position. Then, Step 407 is executed, the 1st-gear engagement load tF1st shown in FIG. 8(C) is set to zero, and the current (FIG. 8(E)) of the electromagnetic valve 105d becomes zero.

Next, in reference to FIG. 9, an example of a third gear shift control by the control shown in FIGS. 3 to 6 is explained. FIG. 9 is a time chart showing the example of the third gear shift control in a vehicle having the automatic transmission control apparatus of the first embodiment of the present invention. The example of this third gear shift control shows contents of the shift control of the so-called range selection when a driver shifts the gear in the neutral N from the N range to D range while the vehicle is not running.

The times of the horizontal axis in FIG. 9 is the same as those in FIG. 7. The vertical axes in FIGS. 9(A) to 9(E) are the same as those in FIGS. 7(A) to 7(E).

Before the time t1, the target gear position tGP_nxt is in a neutral position N as shown in FIG. 9(A), the target standby gear position tGP_stb is also in a neutral position N" as shown in FIG. 9(B), the sleeve-1 position RPslv1 is in N of the neutral position as shown in FIG. 9(D) while the neutral position is standby.

When, at the time t1, the driver operates the lever apparatus 301, the range position signal RngPos is changed from the N range to the D range. Thereby the target gear position tGP_nxt is changed from the neutral gear position N to the 1st gear position in Step 301 (target gear position calculation), it is determined in Step 401 of FIG. 4 that the engagement of the 1st gear is necessary. After Steps 402 to 404, Step 409 of FIG. 4 is executed. In accordance with the setting of FIG. 5(B), generation of shock due to the gear engagement is kept down, and the 1st-gear engagement load tF1st shown in FIG. 9(C) is set to a value (tF1st-max) such that shock due to the gear engagement is kept down, and the engagement of the 1st gear is complete speedily. In Steps 602, 603, and 604 of FIG. 6, a current (FIG. 9(E)) of the electromagnetic valve 105d is controlled so that, from the time t1 to the time t2, the sleeve-1 position RPslv1 shown in FIG. 9(D) moves from the neutral position N to the 1st-gear engagement position. It is determined in Step 402 of FIG. 4 that the 1st gear has been engaged at the time t3 when a predetermined time has elapsed since the time t2. The time 2 is one when the sleeve-1 position RPslv1 has reached the 1st-gear engagement position. Then Step 407 is executed, the 1st-gear engagement load shown in FIG. 9(C) is set to zero, and the current (FIG. 9(E)) of the electromagnetic valve 105d becomes zero.

Next, in reference to FIG. 10, an example of a forth gear shift control by the control shown in FIGS. 3 to 6 is explained.

FIG. 10 is a time chart showing the example of the forth gear shift control in a vehicle having the automatic transmission control apparatus of the first embodiment of the present invention. The example of this forth gear shift control shows contents of the shift control of the so-called range selection when the target standby gear position, which is a target value of a gear to be standby in preparation for the next shifting, is shifted from the forth gear to second gear while the vehicle is running in the 3rd gear.

FIG. 10(A) shows the target gear position tGP_nxt. FIG. 10(B) shows the target standby gear position tGP_stb. FIG. 10(C) shows the 2nd-gear engagement load tF2nd. FIG. 10(D) shows the sleeve-3 position RPslv3. The 4th shows an engagement position of the 4th gear. The N shows a neutral position. The 2nd shows an engagement position of the 2nd gear. FIG. 10(E) shows a current of the electromagnetic valve 105h.

Before the time t1, the target gear position tGP_nxt is in the 3rd gear position as shown in FIG. 10(A), the target standby gear position tGP_stb is in the 4th of "4th gear" as shown in FIG. 10(B), the sleeve-3 position RPslv3 is in the 4th gear position as shown in FIG. 10(D). That is, it shows a situation when the vehicle is running in the 3rd gear, and the 4th gear is standby in preparation for the next shifting.

When, in Step 301 (target gear position calculation) of FIG. 3, the target standby gear position tGP_stb is changed from the 4th gear position to the 2nd gear position at the time t1. The electromagnetic valve 105h shown in FIG. 10(E) is controlled so that the sleeve-3 position RPslv3 shown in FIG. 10(D) moves from the 4th-gear engagement position to the the neutral position N.

When it is determined that the sleeve-3 position RPslv3 shown in FIG. 10(D) is the neutral position N at the time t2, the 2nd-gear engagement load tF2nd shown in FIG. 10(C) is set to a small value such that the 2nd gear can be engaged and deterioration of the third synchromesh 23 is kept down, in accordance with durability of the third synchromesh 23. Then, a current (FIG. 10(E)) of the electromagnetic valve 105h is controlled. From the time t2 to the time t3, the sleeve-3 position RPslv3 shown in FIG. 10(D) moves from the neutral position N to the 2nd-gear engagement position. It is determined that the second gear has been engaged at a time t4 when a predetermined time has elapsed since the time t3. The time 3 is one when the sleeve-3 position RPslv3 shown in FIG. 10(D) has reached the 3rd-gear engagement position. Then the second engagement load tF2nd is set to zero. The current of the electromagnetic valve 105h (FIG. 10(E)) becomes zero.

In this embodiment, as shown in FIGS. 7 to 10, the shift engagement load when the standby gear position is shifted and the shift engagement load in the other case can be made different from each other. Namely, the maximum value of the shift engagement load when the standby gear position is shifted is made smaller than the maximum value of the shift engagement load in the other case, so that deterioration of the synchromesh due to the pre-shift can be kept down.

Additionally, according to this embodiment, even when the synchromesh is engaged in the case other than the shift of the standby gear position, the shift engagement load can be made to change in accordance with several cases, such as in the case of the so-called range selection in which the driver shifts the range, e.g., from the N range to D range, in the case of the automatic shifting mode, and in the case of the manual shifting mode. Furthermore, the shift engagement load is made to change in accordance with the accelerator pedal position. Thereby the engagement operation of the synchromesh can be executed in consideration of the suppression of the shock and in taking account of the response.

Next, in reference to FIGS. 11 to 14, a structure and operation of an automatic transmission control apparatus (including its method) of a second embodiment of the present invention is explained. A structure of a vehicle having the automatic transmission control apparatus of this embodiment is the same as that shown in FIG. 1. A relationship of input and output signals between a transmission control unit and engine control unit in the vehicle having the automatic transmission control apparatus of this embodiment is the same as that in FIG. 2. An overview of a total content of a shift load control by the automatic transmission control apparatus of this embodiment is the same as that of FIG. 3. Details of Step 303 (hydraulic control) are the same as that shown in FIG. 6.

In the embodiment explained in FIGS. 1 to 10, the maximum value tF1st-max of the synchromesh is set smaller than the maximum value of the synchromesh-engagement load when the synchromesh engages to the selected change gear under a condition other than the result of the above-mentioned prediction. On the other hand, this embodiment uses a method in which the engagement load is set in accordance with an elapsed time since a start of the engagement. The shift engagement load (a ratio of change of the engagement load) based on a time transition is made smaller than a ratio of change of the engagement load when the synchromesh engages to the selected change gear under a condition other than the result of said prediction. Namely, this embodiment and the embodiment shown in FIGS. 1 to 10 are common in that the engagement load of the synchromesh in the case of the pre-shift based on the prediction result is different from the engagement load when the synchromesh engages to the selected change gear under a condition other than the result of the prediction. Further, this embodiment and the embodiment shown in FIGS. 1 to 10 are common in that the engagement load of the synchromesh in the case of the pre-shift based on the prediction result is made smaller than the synchromesh-engagement load when the synchromesh engages to the selected change gear under a condition other than the result of said prediction. These embodiments are different only in that a target to be made smaller is a maximum value of the engagement load or a ratio of change of the engagement load.

Figure 11:
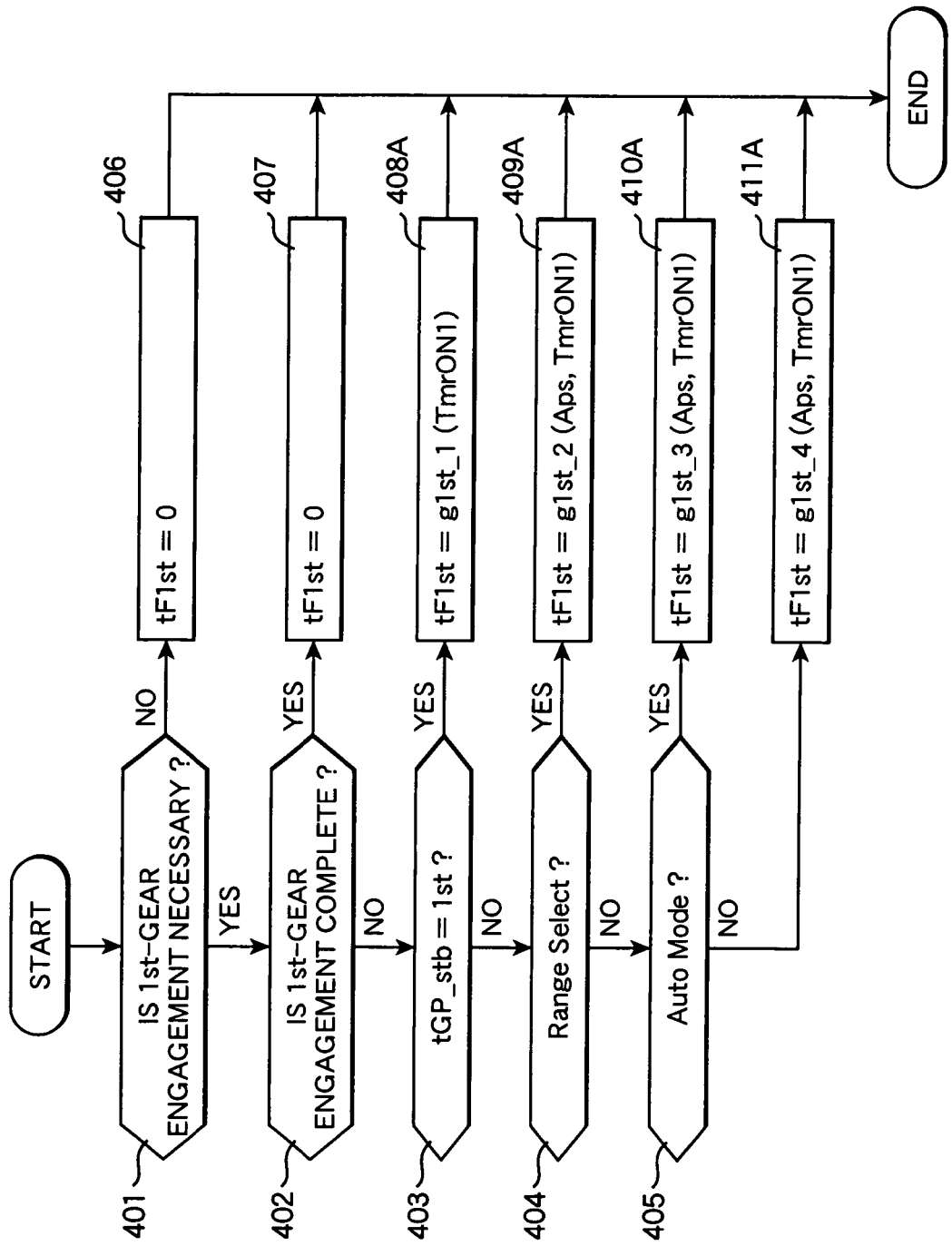
FIG. 11 is a flowchart showing an overview of content of a control for a shift engagement load calculation in a shift load control by an automatic transmission control apparatus of a second embodiment of the present invention.

First, in reference to FIGS. 11, 12, Step 302 (shift engagement load calculation) of FIG. 3 is explained in detail.

FIG. 11 is a flowchart showing an overview of contents of a control for the shift engagement load calculation in the shift load control by the automatic transmission control apparatus of the second embodiment of the present invention. FIG. 12 is an explanatory view of a map used for the shift engagement load calculation in the shift load control by the automatic transmission control apparatus of the second embodiment of the present invention.

FIGS. 11 and 12 show a flowchart for setting the 1st-gear engagement load tF1st in the case of the 1st gear, as one example. The processes of FIGS. 4 and 5 are executed for each gear (1st gear to 5th gear, reverse gear). The 2nd-gear engagement load tF2nd, the 3rd-gear engagement load tF3rd, the 4th-gear engagement load tF4th, the 5th-gear engagement load tF5th, and the reverse-gear engagement load tFRev are calculated, respectively.

In Step 401, the computer 100c determines whether the engagement of the 1st gear is needed. When the 1st gear is not engaged, the flow goes to Step 406 to set the 1st-gear engagement load tF1st to zero, and ends. When the 1st gear is engaged, the flow goes to Step 402.

In Step 402, it is determined whether the 1st gear has been engaged. When the 1st gear has been engaged, the flow goes to Step 407 to set the 1st-gear engagement load tF1st to zero, and ends. When the 1st gear has not been engaged, the flow goes to Step 403.

Figure 12A:
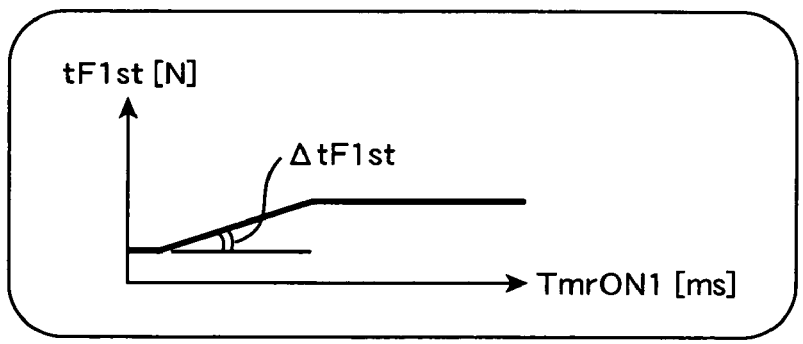
FIGS. 12 are explanatory diagrams of maps used in the shift engagement load calculation in the shift load control by the automatic transmission control apparatus of the second embodiment of the present invention.

In Step 403, it is determined whether the 1st gear is at the standby gear position. When the target standby gear position, which is a target value of a gear to be standby in preparation for the next shifting, is the 1st gear, namely, when the 1st gear is engaged in advance in preparation for the next shifting, the flow goes to Step 408A. The 1st-gear engagement load tF1st is set by a function g1st_1 using an elapsed time TmrON1 since the 1st-gear engagement starts. As shown in FIG. 12(A), the function g1st_1 is a relatively small value (a rate of change ΔtF1st of the engagement load is small) when the 1st-gear-engagement elapsed time TmrON1 is small (just after the start). The value of the function g1st_1 preferably increases gradually as the 1st-gear-engagement elapsed time TmrON1 increases (the time elapses).

The setting of the function g1st_1, namely, the engagement road of the synchromesh in the pre-shift based on the prediction result, is preferably a value which enables the engagement of the 1st gear, and which is as small as possible, in accordance with the durability of the synchromesh. Namely, a time rate of change of the engagement load of the synchromesh in the pre-shift based on the prediction result is made smaller than that in the connection of the synchromesh based on the condition other than the prediction result. Accordingly, deterioration of the synchromesh in the pre-shift can be kept down.

When the 1st gear is not in the standby gear position, namely, when the target gear position tGP_nxt, which is a target value of a running gear of a vehicle, is the 1st gear, and a standby (wait) of the 1st gear is incomplete, the flow goes to Step 404.

In Step 404, it is determined whether the range selection is executed. When it is determined in Step 301 (target gear position calculation) that the range selection is executed, namely, when the 1st gear is engaged by use of, e.g., the N→D range selection and R→D range selection, the flow goes to Step 409A. Then, the 1st-gear engagement load tF1st is set by the function g1st_2 using the 1st-gear-engagement elapsed time TmrON1 and the accelerator position Aps as inputs. As show in FIG. 12(B), basically as well as in FIG. 12(A), the function g1st_2 is a relatively small value when the 1st-gear-engagement elapsed time TmrON1 is small (just the start). As the 1st-gear-engagement elapsed time TmrON1 increase (the time elapses), the function g1st_2 preferably increases gradually. The function g1st_2 is preferably set such that the load gradually increases to keep down shock due to the gear engagement when the accelerator position Aps is small. When the accelerator position Aps is large, namely, when the accelerator position Aps corresponds to, e.g., the racing range selection, the function g1st_2 is preferably set such that the load increases relatively speedily. The function g1st_2 is preferably set to a value such that the engagement of the 1st gear is complete speedily.

When it is determined in Step 404 that the range selection is not executed, the flow goes to 405.

In Step 405, it is determined whether the automatic shifting mode is selected. When it is determined in Step 301 (target gear position calculation) that the automatic shifting mode is selected, the flow goes to Step 410A. Then, the 1st-gear engagement load tF1st is set by the function g1st_3 using the 1st-gear-engagement elapsed time TmrON1 and the accelerator position Aps as inputs. As show in FIG. 12(C), basically as well as in FIGS. 12(A), 12(B), the function g1st_3 is a relatively small value when the 1st-gear-engagement elapsed time TmrON1 is small (just after the start). As the 1st-gear-engagement elapsed time TmrON1 increases (the time elapses), the function g1st_3 preferably increases gradually. The function g1st_3 is set such that the load increases relatively sooner than in FIGS. 12(A), 12(B).

When the automatic shifting mode is not selected, the flow goes to Step 411A. Then, the 1st-gear engagement load tF1st is set by a function g1st_4 using the 1st-gear-engagement elapsed time TmrON1 and the accelerator position Aps as inputs.

Figure 12B:
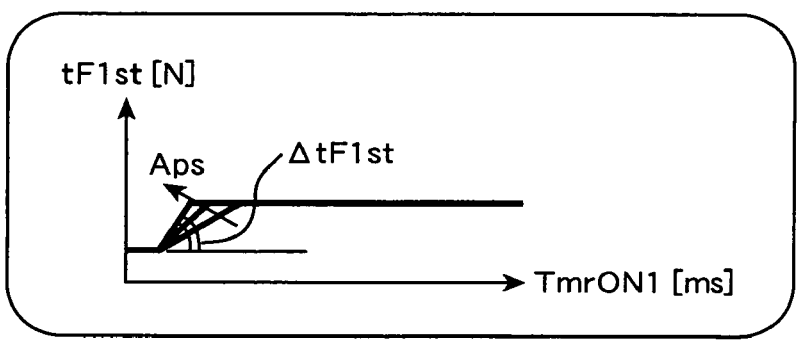
Figure 12C:
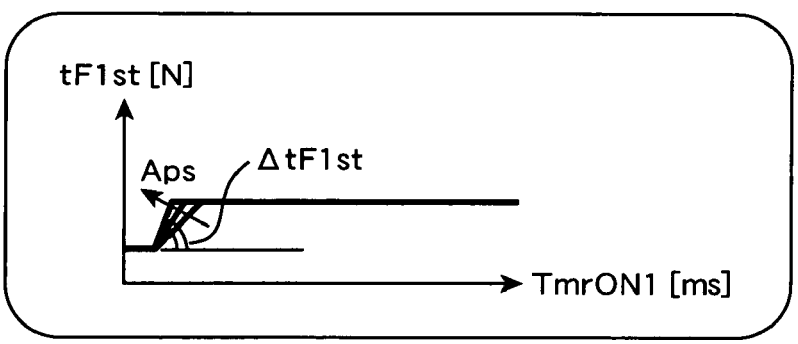
Figure 12D:
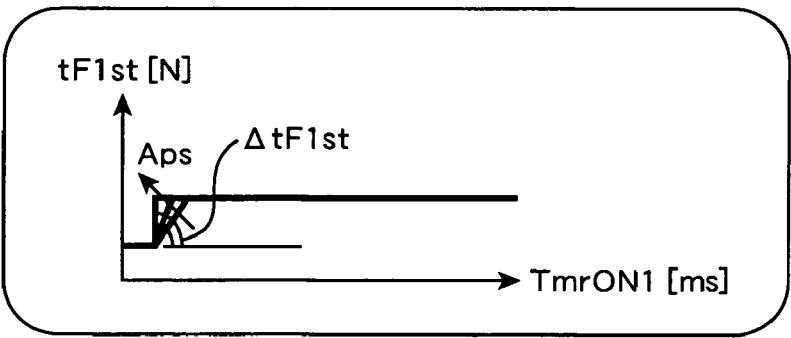

As show in FIG. 12(D), basically as well as in FIGS. 12(A), 12(B), and 12(C), the function g1st_4 is a relatively small value when the 1st-gear-engagement elapsed time TmrON1 is small (just after the start). As the 1st-gear-engagement elapsed time TmrON1 increases (the time elapses), the function g1st_4 preferably increases gradually. Because a response is more taken account in the manual shifting mode than in the automatic shifting mode, the function g1st_4 is set such that the load increases sooner than in FIGS. 12(A), 12(B), and 12(C) to complete the engagement of the 1st gear speedily.

The function g1st_1, function g1st_2, function g1st_3, and function g1st_4 can be preferably set differently for each gear.

Next, in reference to FIG. 13, an example of the first shift control by the controls shown in FIGS. 3, 6, 11, and 12 is explained.

FIG. 13 is a time chart showing the example of the shift control in a vehicle having the automatic transmission control apparatus of the second embodiment of the present invention. The example of this first shift control shows that the target standby gear position, which is a target value of a gear to be standby in preparation for the next shifting, is shifted from the 3rd gear to 1st gear while the vehicle is running in the 2nd gear.

FIG. 13(A) shows the target gear position tGP_nxt. FIG. 13(B) shows the target standby gear position tGP_stb. FIG. 13(C) shows the 1st-gear engagement load tF1st. FIG. 13(D) shows the sleeve-1 position RPslv1. The 3rd shows an engagement position of the 3rd gear. The N shows a neutral position. The 1st shows a mesh position of the 1st gear. FIG. 13(E) shows a current of the electromagnetic valve 105*d*.

Before the time t1, the target gear position tGP_nxt is the 2nd gear as shown in FIG. 13(A), the target standby gear position tGP_stb is the 3rd gear as shown in FIG. 13(B), the sleeve-1 position RPslv1 is an engagement position of the 3rd gear as shown in FIG. 13(D), the vehicle is running in the 2nd gear, and the 3rd gear is standby in preparation for the next shifting.

When, in Step 301 (target gear position calculation) of FIG. 3, the target standby gear position tGP_stb is changed from the 3rd gear to the 1st gear at the time t1, the electromagnetic valve 105*d* shown in FIG. 10(E) is controlled. Then, the sleeve-1 position RPslv1 moves from the 3rd-gear engagement position to the neutral position N.

When it is determined that the sleeve-1 position RPslv1 shown in FIG. 13(D) is the neutral position N at the time t2, it is determined in Step 402 of FIG. 11 that an engagement of the 1st gear is needed. In accordance with the setting of FIG. 12(A) and with durability of the first synchromesh 21, the 1st-gear engagement load tF1st shown in FIG. 13(C) is set to a small value such that the 1st gear can be engaged, and deterioration of the third synchromesh 21 is kept down. In Steps 601, 602, 603, and 604 of FIG. 6, a current (FIG. 13(E)) of the electromagnetic valve 105*d* is controlled. From the time t2 to the time t3, the sleeve-1 position RPslv1 shown in FIG. 13(D) moves from the neutral position N to the 1st-gear engagement position. At the time t4 at which a predetermined time has elapsed since the time t3 at which the sleeve-1 position RPslv1 shown in FIG. 13(D) has reached the 3rd-gear engagement position, it is determined in Step 402 of FIG. 11 that the first gear has been engaged. Step 407 is executed. The 1st-gear engagement load tF1st is set to zero. The current (FIG. 13(E)) of the electromagnetic valve 105*d* becomes zero.

Next, in reference to FIG. 14, an example of the second shift control by the controls shown in FIGS. 3, 6, 11, and 12 is explained.

FIG. 14 is a time chart showing the example of the second shift control in a vehicle having the automatic transmission control apparatus of the second embodiment of the present invention. The example of this second shift control shows that a driver directs a down shift from the 2nd gear to 1st gear in the manual shifting mode while the vehicle is running in the 2nd gear, and the 3rd gear is standby in preparation for the next shifting.

Times of the horizontal axis in FIG. 14 are the same as ones in FIG. 13. The horizontal axes in FIGS. 14(A) to 14(E) are the same as ones in FIGS. 13(A) to (E).

Before the time t1, the target gear position tGP_nxt is 2nd gear as shown in FIG. 14(A), the target standby gear position tGP_stb is 3rd gear as shown in FIG. 14(B), the sleeve-1 position RPslv1 is an engagement position of "3rd gear" as shown in FIG. 14 (D) while a vehicle is running in the 2nd gear, and the 3rd gear is standby in preparation for the next shifting.

When a driver operates the down switch 307 so that the target gear position tGP_nxt shown in FIG. 14(A) is changed from the 2nd gear to the 1st gear in Step 301 (target gear position calculation) of FIG. 3 at the time t1, the electromagnetic valve 105*d* shown in FIG. 14(E) is controlled. Then, the sleeve-1 position RPslv1 shown in FIG. 14(D) moves from the the 3rd-gear engagement position to the neutral position N.

When it is determined that the sleeve-1 position RPslv1 shown in FIG. 14(D) is the neutral position N at the time t2, it is determined in Step 401 of FIG. 11 that an engagement of the 1st gear is needed. After Steps 402 to 405, Step 411 of FIG. 11 is executed. In accordance with the setting of FIG. 12(D), the 1st-gear engagement load tF1st shown in FIG. 14(C) is set such that the load increases relatively speedily in taking account of a response for the manual shifting mode. A current (FIG. 14(E)) of the electromagnetic valve 105*d* is controlled in Steps 601, 602, 603, and 604 of FIG. 6. From the time t2 to the time t3, the sleeve-1 position RPslv1 shown in FIG. 14(D) moves from the neutral position N to the 1st gear engagement position within a shorter time than that in FIG. 13. It is determined in Step 402 of FIG. 11 that the 1st gear has been engaged at the time t4 at which a predetermined time has elapsed since the time t3 at which the sleeve-1 position RPslv1 shown in FIG. 14(D) has reached the 1st-gear engagement position. Then, Step 407 is executed, the 1st-gear engagement load tF1st shown in FIG. 14(C) is set to zero, and the current (FIG. 14(E)) of the electromagnetic valve 105*d* becomes zero.

In this embodiment, as described above, a rate of change of the shift engagement load in the case where the standby gear position is shifted, is different from a rate of change of the shift engagement load in the other case. Namely, a rate of change of the shift engagement load in the case where the standby gear position is shifted, is made smaller than a rate of change of the shift engagement load in the other case, so that deterioration of the synchromesh due to the pre-shift can be suppressed.

Even when the synchromesh is engaged in a case other than the shift of the standby gear position, the shift engagement load is made to change in the cases of the so-called range selection in which the driver shifts the range, e.g., from the N range to D range, the automatic shifting mode, and the manual shifting mode. The shift engagement load is made to change in accordance with the accelerator pedal position, so that the engagements of the synchromesh can be done in taking account of the keeping-down of the shock, and in favor of the response.

Next, in reference to FIG. 15, a structure and operation of an automatic transmission control apparatus of a third embodiment of the present invention is explained. The basic structure and operation are the same as those shown in FIGS. 1 to 6. In this embodiment, part of the example of the first shift control shown in FIG. 7 is changed.

FIG. 15 is a time chart showing an example of the first shift control in a vehicle having the automatic transmission control apparatus of the third embodiment of the present invention. The example of this first shift control shows a content of the shift control where the target standby gear position, which is a target value of a gear to be standby in preparation for the next shifting, is shifted from the 3rd gear to 1st gear while the vehicle is running in the 2nd gear.

In this embodiment, as shown in FIG. 15(C), in a rise of the engagement load, instantaneous engagement loads tF1st-ist1, tF1st-ist2, which rise instantaneously, are added. Accordingly, a response in the engagement can be improved. In this case, the maximum value (tF1st-max) of the shift engagement load in the case where the standby gear position is shifted, is made smaller than the maximum value of the shift engagement load in the other case. As a result, deterioration of the synchromesh due to the pre-shift can be kept down. The instantaneous engagement loads tF1st-ist1, tF1st-ist2 for improving the response are applied instantaneously. The maximum value of the engagement load is not a load applied instantaneously as shown, but continues during a predetermined time. The tF1st-max as shown is the maximum value.

In this embodiment, the shift engagement load in the case where the standby gear position is shifted is different from the shift engagement load in the other case. Namely, the maximum value of the shift engagement load in the case where the standby gear position is shifted is made smaller than the maximum value of the shift engagement load in the other case, so that deterioration of the synchromesh due to the pre-shift can be suppressed.

By applying the instantaneous engagement load, the response can be improved.

What is claimed is:

1. An automatic transmission control apparatus used for an automatic transmission comprising:
    plural friction transfer mechanisms for transferring and cutting off output power from a driving power source,
    plural transmission-input shafts connected to said friction transfer mechanisms, respectively, and
    plural change gear trains for selectively connecting between one of said input shafts and a transmission-output shaft by selectively engaging to anyone selected among plural synchromeshes,
    wherein a desired change gear transmission is set by connecting one of said input shafts to said output shaft by engaging the selected synchromesh to the selected change gear and engaging one friction transfer mechanism corresponding to one input shaft to be connected to said output shaft while disengaging other friction transfer mechanism,
    a controller which predicts a next gear change position while executing transmission under a current gear change position, and controls a predetermined synchromesh in accordance with a result of said prediction to execute a standby control so that a transmission-input shaft connected to a friction transfer mechanism not being used for said current gear change position and said output shaft are connected to each other via gears predicted to be said next gear change position,
    wherein said controller makes the engagement load of the synchromesh when the synchromesh engages to the selected change gear in accordance with the result of said prediction smaller than the synchromesh-engagement load when the synchromesh engages to the selected change gear under a condition other than the result of said prediction.

2. An automatic transmission control apparatus used for an automatic transmission comprising:
    plural friction transfer mechanisms for transferring and cutting off output power from a driving power source,
    plural transmission-input shafts connected to said friction transfer mechanisms, respectively, and
    plural change gear trains for selectively connecting between one of said input shafts and a transmission-output shaft by selectively engaging to anyone selected among plural synchromeshes,
    wherein a desired change gear transmission is set by connecting one of said input shafts to said output shaft by engaging the selected synchromesh to the selected change gear and engaging one friction transfer mechanism corresponding to one input shaft to be connected to said output shaft while disengaging other friction transfer mechanism,
    a controller which predicts a next gear change position while executing transmission under a current gear change position, and controls a predetermined synchromesh in accordance with a result of said prediction to execute a standby control so that a transmission-input shaft connected to a friction transfer mechanism not being used for said current gear change position and said output shaft are connected to each other via gears predicted to be said next gear change position,
    wherein said controller makes a maximum value in the synchromesh-engagement load when the synchromesh engages to the selected change gear in accordance with the result of said prediction smaller than that when the synchromesh engages to the selected change gear under a condition other than the result of said prediction.

3. The automatic transmission control apparatus according to claim 1,
    wherein the controller makes a rate of change in the synchromesh-engagement load when the synchromesh engages to the selected change gear in accordance with the result of said prediction smaller than that when the synchromesh engages to the selected change gear under a condition other than the result of said prediction.

4. An automatic transmission comprising:
    plural friction transfer mechanisms for transferring and cutting off output power from a driving power source,
    plural transmission-input shafts connected to said friction transfer mechanisms, respectively,
    plural change gear trains for selectively connecting between one of said input shafts and a transmission-output shaft by selectively engaging to anyone selected among plural synchromeshes,
    wherein a desired change gear transmission is set by connecting one of said input shafts to said output shaft by engaging the selected synchromesh to the selected change gear and engaging one friction transfer mechanism corresponding to one input shaft to be connected to said output shaft while disengaging other friction transfer mechanism,
    a controller which predicts a next gear change position while executing transmission under a current gear change position, and controls a predetermined synchromesh in accordance with a result of said prediction to execute a standby control so that a transmission-input shaft connected to a friction transfer mechanism not being used for said current gear change position and said output shaft are connected to each other via gears predicted to be said next gear change position,
    wherein said controller makes the engagement load of the synchromesh when the synchromesh engages to the selected change gear in accordance with the result of said prediction smaller than a synchromesh-engagement load when the synchromesh engages to the selected change gear under a condition other than the result of said prediction.

5. A control method for an automatic transmission having:
    plural friction transfer mechanisms for transferring and cutting off output power from a driving power source,
    plural transmission-input shafts connected to said friction transfer mechanisms, respectively, and
    plural change gear trains for selectively connecting between one of said input shafts and a transmission-output shaft by selectively engaging to anyone selected among plural synchromeshes,
    wherein a desired change gear transmission is set by connecting one of said input shafts to said output shaft by engaging the selected synchromesh to the selected change gear and engaging one friction transfer mechanism corresponding to one input shaft to be connected to said output shaft while disengaging other friction transfer mechanism, said control method comprising:
predicting a next gear change position while executing transmission under a current gear change position,
controlling a predetermined synchromesh in accordance with a result of said prediction to execute a standby control so that a transmission-input shaft connected to a friction transfer mechanism not being used for said current gear change position and said output shaft are connected to each other via gears predicted to be said next gear change position,
such that a synchromesh-engagement load when the synchromesh engages to the selected change gear in accordance with the result of said prediction is made to be different from a synchromesh-engagement load when the synchromesh engages to the selected change sear under a condition other than the result of said prediction.

* * * * *